(12) United States Patent
Ergezen et al.

(10) Patent No.: US 11,278,883 B2
(45) Date of Patent: Mar. 22, 2022

(54) SAMPLE PROCESSING SYSTEMS AND METHODS

(71) Applicants: Roche Diagnostics Hematology, Inc., Brighton, MA (US); Roche Diagnostics Operations, Inc., Indianapolis, IN (US)

(72) Inventors: Ertan Ergezen, Boston, MA (US); Stephen Conroy, Maynard, MA (US); Rijk Edwin Oosterbroek, Cham (CH); Claudio Cherubini, Cham (CH)

(73) Assignees: Roche Diagnostics Hematology, Inc., Indianapolis, IN (US); Roche Diagnostics Operations, Inc., Indianapolis, IN (US)

( * ) Notice: Subject to any disclaimer, the term of this patent is extended or adjusted under 35 U.S.C. 154(b) by 91 days.

(21) Appl. No.: 16/474,942

(22) PCT Filed: Dec. 29, 2017

(86) PCT No.: PCT/US2017/068883
§ 371 (c)(1),
(2) Date: Jun. 28, 2019

(87) PCT Pub. No.: WO2018/126098
PCT Pub. Date: Jul. 5, 2018

(65) Prior Publication Data
US 2019/0344260 A1 Nov. 14, 2019

Related U.S. Application Data

(60) Provisional application No. 62/440,847, filed on Dec. 30, 2016.

(51) Int. Cl.
*B01L 1/00* (2006.01)
*B01L 3/02* (2006.01)
(Continued)

(52) U.S. Cl.
CPC ............... *B01L 3/0293* (2013.01); *B01L 9/52* (2013.01); *G01N 1/312* (2013.01);
(Continued)

(58) Field of Classification Search
None
See application file for complete search history.

(56) References Cited

U.S. PATENT DOCUMENTS 8,454,908 B2 * 6/2013 Lapen ............... G01N 35/0099
422/536
2004/0206399 A1 10/2004 Heller et al.
(Continued)

FOREIGN PATENT DOCUMENTS

CN 102007565 A 4/2011
CN 103299173 9/2013
(Continued)

OTHER PUBLICATIONS

Chen et al., "Fabrication of Switches on Polymer-Based by Hot Embossing," DTIP of MEMS and MOEMS, Stresa, Italy Apr. 26-28, 2006, 5 pages.
(Continued)

*Primary Examiner* — Jyoti Nagpaul
(74) *Attorney, Agent, or Firm* — Fish & Richardson P.C.

(57) ABSTRACT

The disclosure features methods, fluid delivery platforms, and apparatus for preparing a sample on a substrate that includes a substrate handler configured to move a substrate between a first position and a second position, and a platform positioned so that when the substrate is in the second position, the platform faces the substrate, where the platform includes a fluid delivery area having a second surface formed from a hydrophilic material for which a water contact angle is 40 degrees or less, and a first surface facing the substrate when the substrate is in the second position, (Continued)

formed from a hydrophobic material for which a water contact angle is 100 degrees or more.

29 Claims, 23 Drawing Sheets

(51) Int. Cl.
  *B01L 9/00*    (2006.01)
  *G01N 1/31*    (2006.01)
  *G01N 35/00*   (2006.01)
(52) U.S. Cl.
  CPC .. *G01N 35/00029* (2013.01); *B01L 2200/143* (2013.01); *B01L 2300/089* (2013.01); *B01L 2300/0822* (2013.01); *B01L 2300/161* (2013.01); *B01L 2400/0406* (2013.01); *B01L 2400/0487* (2013.01); *G01N 2035/00138* (2013.01)

(56) References Cited

U.S. PATENT DOCUMENTS

| | | |
|---|---|---|
| 2012/0108461 A1 | 5/2012 | Bussan et al. |
| 2013/0203100 A1 | 8/2013 | Otter et al. |
| 2016/0018302 A1 | 1/2016 | Lapen et al. |

FOREIGN PATENT DOCUMENTS

| | | |
|---|---|---|
| CN | 103587837 A | 2/2014 |
| CN | 203568342 | 4/2014 |
| CN | 105765440 | 7/2016 |
| EP | 0414405 A | 2/1991 |
| WO | 2005-270845 | 10/2005 |
| WO | 2015/051295 | 4/2015 |
| WO | 2015-510111 | 4/2015 |
| WO | WO 2015/051295 | 4/2015 |
| WO | 2016-020918 | 2/2016 |

OTHER PUBLICATIONS

Nugen et al., "PMMA biosensor for nucleic acids with integrated mixer and electrochemical detection," Biosensors and Bioelectronics, Apr. 15, 2009, 24(8):2428, 3 pages.
Shiu et al., "Rapid fabrication of tooling for microfluidic devices via laser micromachinine and hot embossing," Journal of Micromechanics and Microengineering, Jan. 4, 2008, 18(2):025012, 8 pages.
JP Office Action in Japanese Appln. No. 2019-535831, dated Nov. 17, 2020, 12 pages (with English translation).
International Search Report and Written Opinion dated Jun. 29, 2018 in international application No. PCT/US2017/068883, 21 pgs.
CN Office Action in Chinese Appln. No. 201780087503.9, dated May 8, 2021, 19 pages (with English translation).

* cited by examiner

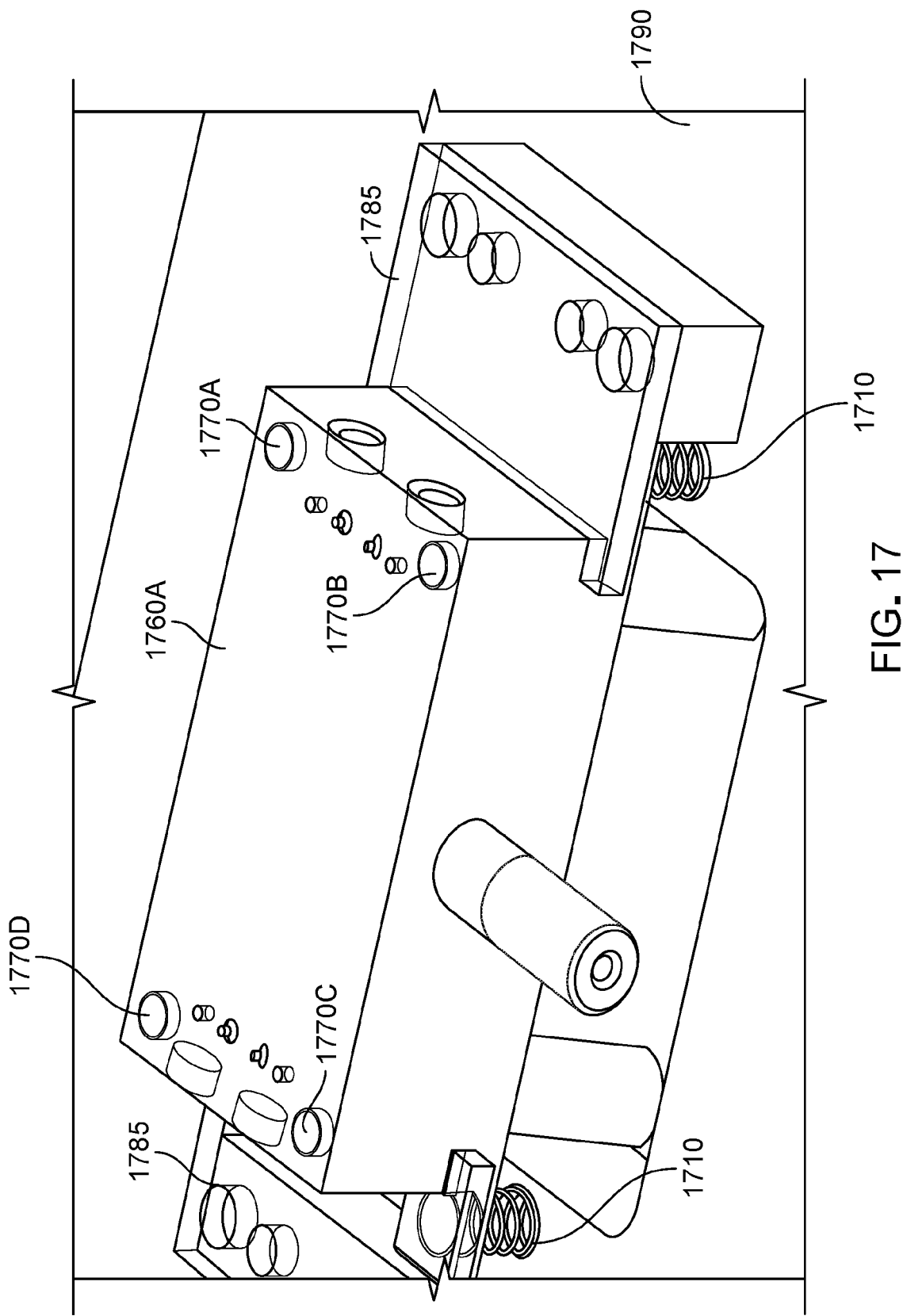

SAMPLE PROCESSING SYSTEMS AND METHODS

CROSS-REFERENCE TO RELATED APPLICATIONS

This application is a national stage application under 35 U.S.C. § 371 of International Application No. PCT/US2017/068883, filed on Dec. 29, 2017, which claims priority to U.S. Provisional Patent Application No. 62/440,847, filed on Dec. 30, 2016, the entire contents of which are incorporated herein by reference.

TECHNICAL FIELD

This disclosure relates to sample processing systems for use with various fluid samples such as blood and other biological fluids, and with tissue samples.

BACKGROUND

Laboratory technicians have for many years examined a variety of biological samples by first applying a sample to a substrate such as a microscope slide, and then viewing the prepared substrate, e.g., under a microscope. Manual application procedures are subject to variations in quality that are due to differences in skill and experience among individual technicians, as well as day-to-day variations in the application steps. Further, the manual preparation of biological samples on substrates is comparatively slow as it typically involves multiple labor-intensive steps.

SUMMARY

The present disclosure features systems and methods for automated preparation of a sample on a substrate for subsequent examination, classification, and diagnostic operations. In general, a sample is applied to a substrate such as a microscope slide or cover slip. Once applied, the sample is further processed by exposing the sample on the substrate to a variety of additional processing steps, some or all of which involve the application of fluids to the sample. These additional processing steps are performed in automated fashion to ensure higher uniformity and consistency among prepared samples than would otherwise be possible via manual preparation. Automation of the processing steps can also achieve higher throughput than would otherwise be possible via manual processing, thereby reducing the cost of sample processing by reducing the amount of manual labor involved.

The systems and methods disclosed herein are generally used to apply samples to substrates for further analysis. Samples that can be applied to substrates include, for example, a blood sample containing red blood cells, white blood cells, and platelets. In addition, other biological samples that include red blood cells and/or white blood cells and/or platelets, such as bone marrow, urine, vaginal tissue, epithelial tissue, tumors, semen, and saliva, can also be applied to substrates. Other fluids that can be applied to substrates and that can contain cells of interest include, but are not limited to, cerebrospinal fluid (CSF), serous fluids including pleural fluid, peritoneal fluid (e.g., due to conditions such as ascites), pericardial fluid, synovial fluid, and continuous ambulatory peritoneal dialysis (CAPD) fluid. Fluids that do not contain cells but which can also be applied to substrates include, but are not limited to, blood plasma and serum.

The systems and methods disclosed herein can also be used to apply fluids that include analytes of interest onto the surface of a substrate for immobilization. For example, the substrate surface can be functionalized with capture molecules or ligands selected to bind to particular analytes. The systems and methods disclosed herein can be used to apply a fluid that includes biological analyte molecules onto the functionalized surface of the substrate, where the analyte molecules are captured on the substrate surface. Substrates with captured analytes can then be processed via a variety of diagnostic procedures and assays.

Subsequent processing steps that are used to prepare a sample applied to a substrate can include exposing the sample to one or more fluids for fixing, staining, and rinsing the sample. Fluid transport steps, such as fluid delivery, agitation, and fluid evacuation, and other preparative steps such as drying, can also be involved in sample preparation.

In general, the systems and methods disclosed herein provide for rapid, efficient, and highly uniform sample processing using minimal fluid quantities. The methods typically include one or more fixing, staining, and rinsing phases, including one or multiple agitation phases during or after one or more of the fixing, staining, and rinsing phases. The systems can be implemented as a standalone device or as a component in a larger system for preparing and examining biological samples.

In general, in a first aspect, the disclosure features apparatus for preparing a sample on a substrate that includes a substrate handler configured to move a substrate between a first position and a second position, and a platform positioned so that when the substrate is in the second position, the platform faces the substrate, where the platform features a fluid delivery area having a second surface formed from a hydrophilic material for which a water contact angle is 40 degrees or less, and a first surface facing the substrate when the substrate is in the second position, formed from a hydrophobic material for which a water contact angle is 100 degrees or more.

Embodiments of the apparatus can include any one or more of the following features.

The platform can include a first member formed of the hydrophilic material, and a layer of the hydrophobic material disposed on at least a portion of the first member to form the first surface. A thickness of the hydrophobic material layer measured in a direction perpendicular to a plane defined by the first surface can be 100 microns or less (e.g., 5 microns or less).

The hydrophilic material can include at least one material selected from the group consisting of mica, glass, and glass-ceramic composite materials. The hydrophilic material can include at least one material selected from the group consisting of metals and metal oxides. The hydrophilic material can include an oxidized product of the hydrophobic material. The hydrophobic material can include at least one material selected from the group consisting of polydimethylacrylamide, polydimethylsiloxane, polyolefins, and fluoropolymers.

The apparatus can include at least one spacer positioned on the first surface so that when the substrate is in the second position, the substrate contacts the at least one spacer, and a maximum variation in a closest distance between the substrate and the first surface for any two locations on the first surface is 10 microns or less.

The apparatus can include a fluid outlet port positioned on the second surface. A center of the fluid outlet port can be displaced from a central axis of the fluid delivery area along a direction orthogonal to the central axis. The apparatus can include first and second fluid inlet ports positioned on the second surface on opposite sides of a central axis of the fluid delivery area, where for each of the first and second fluid inlet ports, a flow axis extends between a center of the fluid inlet port and the fluid outlet port, and an angle between the flow axis and the central axis of the recess is $\alpha$.

The apparatus can include third and fourth fluid inlet ports positioned on the second surface on opposite sides of the central axis, where for each of the third and fourth fluid inlet ports, a flow axis extends between a center of the fluid inlet port and the fluid outlet port, and an angle between the flow axis and the central axis of the recess is $\beta$. The value of $\alpha$ can be 15 degrees or less (e.g., 10 degrees or less). The value of $\beta$ can be 10 degrees or less (e.g., 6 degrees or less). The value of $\alpha$ can be larger than the value of $\beta$.

A maximum depth of the fluid delivery area, measured along a direction perpendicular to the upper surface, can be 200 microns or less (e.g., 150 microns or less). A difference between the water contact angles of the hydrophobic material and the hydrophilic material can be 50 degrees or more (e.g., 70 degrees or more).

The second surface can be planar. The fluid delivery area can form a recess in the first surface, and the recess can include lateral wall surfaces that extend between the first and second surfaces. Each pair of adjacent lateral wall surfaces can be oriented so that an angle subtended by the surfaces is more than 90 degrees. Each pair of adjacent lateral wall surfaces can blend along a rounded fillet.

The recess can include: parallel first and second lateral wall surfaces; a third lateral wall surface orthogonal to the first and second lateral wall surfaces; fourth and fifth lateral wall surfaces extending between the third lateral wall surface and the first and second lateral wall surfaces, respectively; and sixth and seventh lateral wall surfaces that extend from the first and second lateral wall surfaces, respectively, and that intersect. The bottom surface of the recess can have a heptagonal transverse shape, and at least some of the lateral wall surfaces of the recess can have different lengths. The first, second, third, and fourth fluid inlet ports can be positioned closer to the third lateral wall surface than to the sixth and seventh lateral wall surfaces.

Embodiments of the apparatus can also include any of the other features disclosed herein, including features disclosed in connection with different embodiments, in any combination except where expressly stated otherwise.

In another aspect, the disclosure features fluid delivery platforms that include a first surface and at least one spacer extending from the first surface and configured to contact a substrate to maintain a fixed spacing between the substrate and the first surface, where the first surface includes a first material, where a second surface forms a bottom of a recess in the first surface and includes a second material different from the first material, and where a difference between a water contact angle of the first material and a water contact angle of the second material is 50 degrees or more.

Embodiments of the platforms can include any one or more of the following features.

The difference between the water contact angles can be 70 degrees or more. The water contact angle of the first material can be 100 degrees or more. The water contact angle of the second material can be 40 degrees or less.

The first material can include at least one material selected from the group consisting of polydimethylacrylamide, polydimethylsiloxane, polyolefins, and fluoropolymers. The second material can include at least one material selected from the group consisting of mica, glass, and glass-ceramic composite materials. The second material can include at least one material selected from the group consisting of metals and metal oxides. The second material can include an oxidized product of the first material.

The first surface can be formed by a layer of the first material disposed on a substrate of the second material, and a thickness of the layer of the first material measured in a direction perpendicular to a plane defined by the first surface can be 100 microns or less (e.g., 5 microns or less).

The platforms can include one or more deformable members positioned opposite to the first surface and between the platform and a support base. The one or more deformable members can include at least one of springs, elastomeric materials, metallic materials, polymer materials, rubber materials, foam materials, magnetic suspension elements, electromagnetic suspension elements, hydraulic suspension elements, and pneumatic suspension elements.

Embodiments of the platforms can also include any of the other features disclosed herein, including features disclosed in connection with different embodiments, in any combination except where expressly stated otherwise.

In a further aspect, the disclosure features fluid delivery platforms that include a first surface, a recess formed in the first surface and having a bottom formed by a second surface, at least one spacer extending from the upper surface and configured to contact a substrate to maintain a fixed spacing between the substrate and the first surface, a fluid outlet port positioned along the second surface, where a center of the fluid outlet port is located along a central axis of the recess, first and second fluid inlet ports positioned along the second surface on opposite sides of the central axis, and third and fourth fluid inlet ports positioned along the second surface on opposite sides of the central axis, where for each of the first and second fluid inlet ports, a flow axis extends between a center of the fluid inlet port and the fluid outlet port, and an angle between the flow axis and the central axis of the recess is $\alpha$, where for each of the third and fourth fluid inlet ports, a flow axis extends between a center of the fluid inlet port and the fluid outlet port, and an angle between the flow axis and the central axis of the recess is $\beta$, and where a is larger than $\beta$.

Embodiments of the platforms can include any one or more of the following features.

Each of the first and second fluid inlet ports can be located a distance $a_1$ from the fluid outlet port along respective flow axes, each of the third and fourth fluid inlet ports is located a distance $b_1$ from the fluid outlet port along respective flow axes, and wherein $a_1$ is larger than $b_1$. The value of $\alpha$ can be 15 degrees or less (e.g., 10 degrees or less). The value of $\beta$ can be 10 degrees or less (e.g., 6 degrees or less).

The recess can include: parallel first and second lateral wall surfaces; a third lateral wall surface orthogonal to the first and second lateral wall surfaces; fourth and fifth lateral wall surfaces extending between the third lateral wall surface and the first and second lateral wall surfaces, respectively; and sixth and seventh lateral wall surfaces that extend from the first and second lateral wall surfaces, respectively, and that intersect. The second surface can have a heptagonal transverse shape, and at least some of the lateral wall surfaces of the recess can have different lengths. The first, second, third, and fourth fluid inlet ports can be positioned closer to the third lateral wall surface than to the sixth and seventh lateral wall surfaces.

The platforms can include one or more deformable members positioned opposite to the first surface and between the platform and a support base. The one or more deformable members can include at least one of springs, elastomeric materials, metallic materials, polymer materials, rubber materials, foam materials, magnetic suspension elements, electromagnetic suspension elements, hydraulic suspension elements, and pneumatic suspension elements.

Embodiments of the platforms can include any of the other features disclosed herein, including features disclosed in connection with different embodiments, in any combination except where expressly stated otherwise.

In another aspect, the disclosure features methods of applying fluid to a substrate, the methods including: positioning the substrate with respect to a platform of a fluid delivery system so that the substrate faces the platform and is separated from the platform by a gap, where the platform features a first surface facing the substrate when the substrate faces the platform, and formed from a hydrophobic material for which a water contact angle is 100 degrees or more, a fluid delivery area featuring a second surface formed from a hydrophilic material for which a water contact angle is 40 degrees or less, a plurality of fluid inlet ports positioned on the second surface, and a fluid outlet port positioned on the second surface; filling the gap with the fluid by delivering the fluid through the plurality of fluid inlet ports, and thereby contacting the substrate with the fluid; and removing the fluid from the gap by discharging the fluid through the fluid outlet port.

Embodiments of the methods can include any one or more of the features disclosed herein, including features disclosed in connection with different embodiments, in any combination except where expressly stated otherwise.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

FIGS. 17 and 18 are schematic diagrams of a fluid delivery platform.

Like reference symbols in the various drawings indicate like elements.

DETAILED DESCRIPTION

Figure 1:
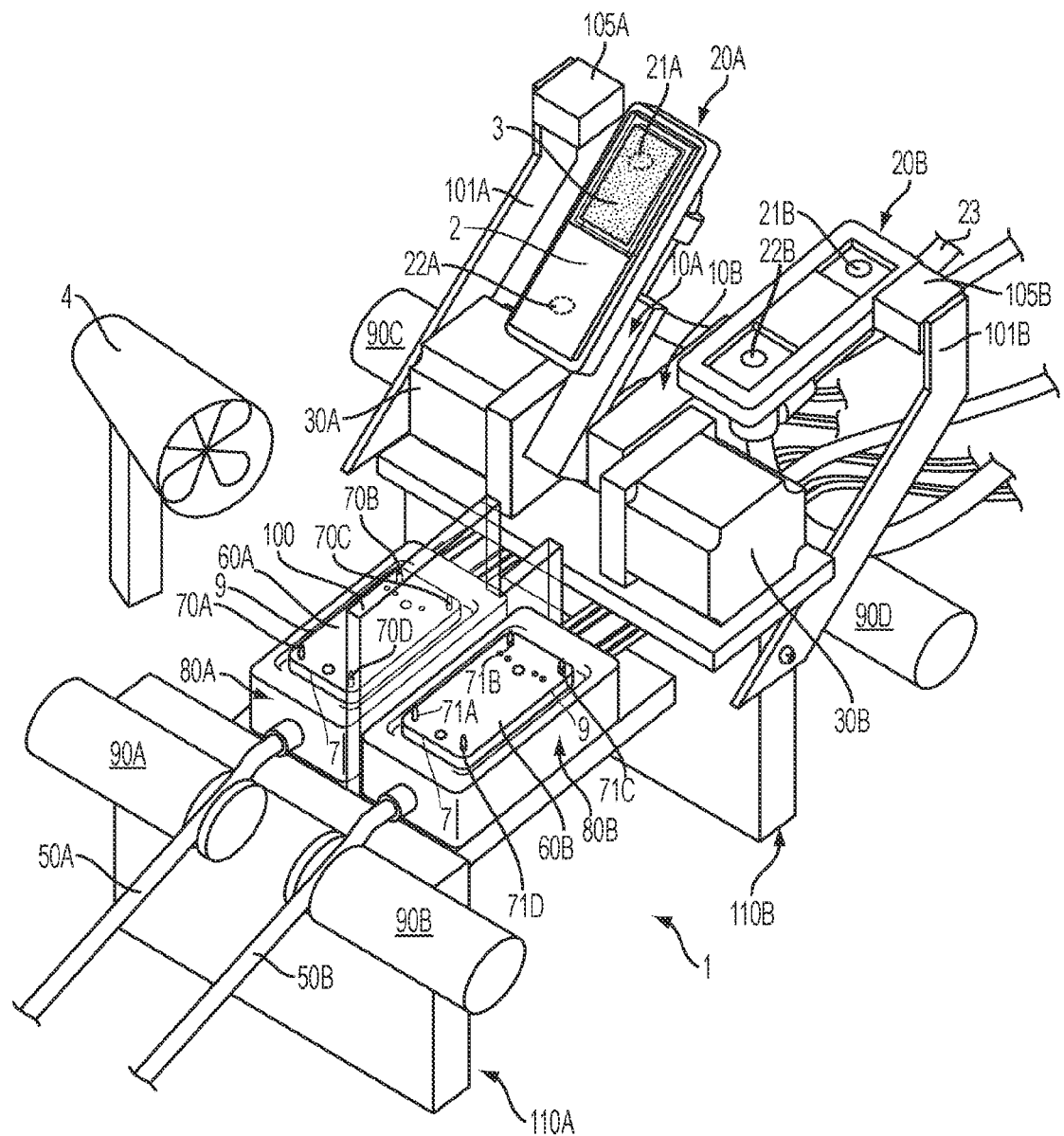
FIGS. 1-4 are schematic diagrams showing portions of a system for processing substrate-mounted specimens.

Disclosed herein are methods and systems for automated biological sample processing. The automated sample processing methods and systems provide advantages over manual and other automated processing methods, including enhanced processing speed while using minimal reagent volumes and concurrently producing a highly uniform sample preparation that significantly reduces the variability associated with the application of stains, fixatives, and other reagents as compared to samples processed by hand or by other systems.

Conventional automated processing methods typically have relatively high processing throughput while at the same time consuming large volumes of processing fluids, or have relatively low processing throughput while consuming reduced volumes of fluids. For many applications, however, both high throughput operation and low fluid consumption are desirable. By maintaining high throughput, samples can be efficiently processed for subsequent examination. By keeping fluid consumption low, the amount of processing waste is reduced along with the required volume of processing reagents, keeping operating costs low. Reduced fluid consumption is also advantageous because less waste fluid is generated, requiring system users to handle and dispose of smaller quantities of waste, and requiring smaller reservoirs for waste fluid storage on-board the systems. The generation of smaller quantities of waste is also beneficial environmentally, as fewer potential hazardous materials require treatment.

The systems and methods disclosed herein permit rapid automated processing of samples (e.g., more than 100 samples per hour by a single machine) using low volumes of processing fluids (e.g., less than 1 mL of fluids per sample), while producing highly uniform and repeatable results. Even for systems that process samples at lower throughput levels, however, many of the foregoing advantages are still realized, including reduced fluid consumption, reduced waste production, storage, and handling, and reduced operating costs.

Introduction—Sample Preparation Systems and Methods

By way of example, the following discussion focuses on applying a fluid that includes blood cells to the surface of a substrate to illustrate many of the features of the systems and methods disclosed herein. However, it should be understood that the methods and systems are not restricted to only this application. To the contrary, as explained above, the methods and systems can be used to apply a wide range of fluids—including fluids that contain cells and fluids that do not contain cells—to the surface of a substrate in controlled fashion. The following discussion of the application of cell-containing solutions to substrate surfaces, and performing cell-based analyses of the deposited samples, should in no way be interpreted to restrict the methods and systems to the handling of such samples.

Also by way of example, the discussion focuses on features of specific embodiments of the systems. However, it should be understood that the systems and their various components can be implemented in a variety of ways. For example, as will be discussed later, other configurations of the platform can also be used in connection with the methods and systems disclosed herein. The following discussion, except where expressly noted or otherwise evident, should in no way be interpreted as being restricted to the specific embodiments of various system configurations and components disclosed herein.

Prior to examination, a sample applied to a substrate is generally processed in a series of steps to enhance the visual appearance of certain features of the sample. FIG. 1 illustrates an embodiment of a system 1 for preparing a biological sample for examination or imaging on a substrate 2 such as a microscope slide, cover slip, or other transparent substrate. System 1 can be incorporated into an overall system for preparing and analyzing samples that include body fluids or other biological samples containing cells. System 1 can generally include, or form a portion of, a system that obtains a sample, applies the sample to a substrate, fixes and stains the sample, dries the sample, images the sample, and analyzes the images and other data obtained from the sample. System 1 can also be used in other sample preparation systems and/or as a stand-alone device.

Figure 4:
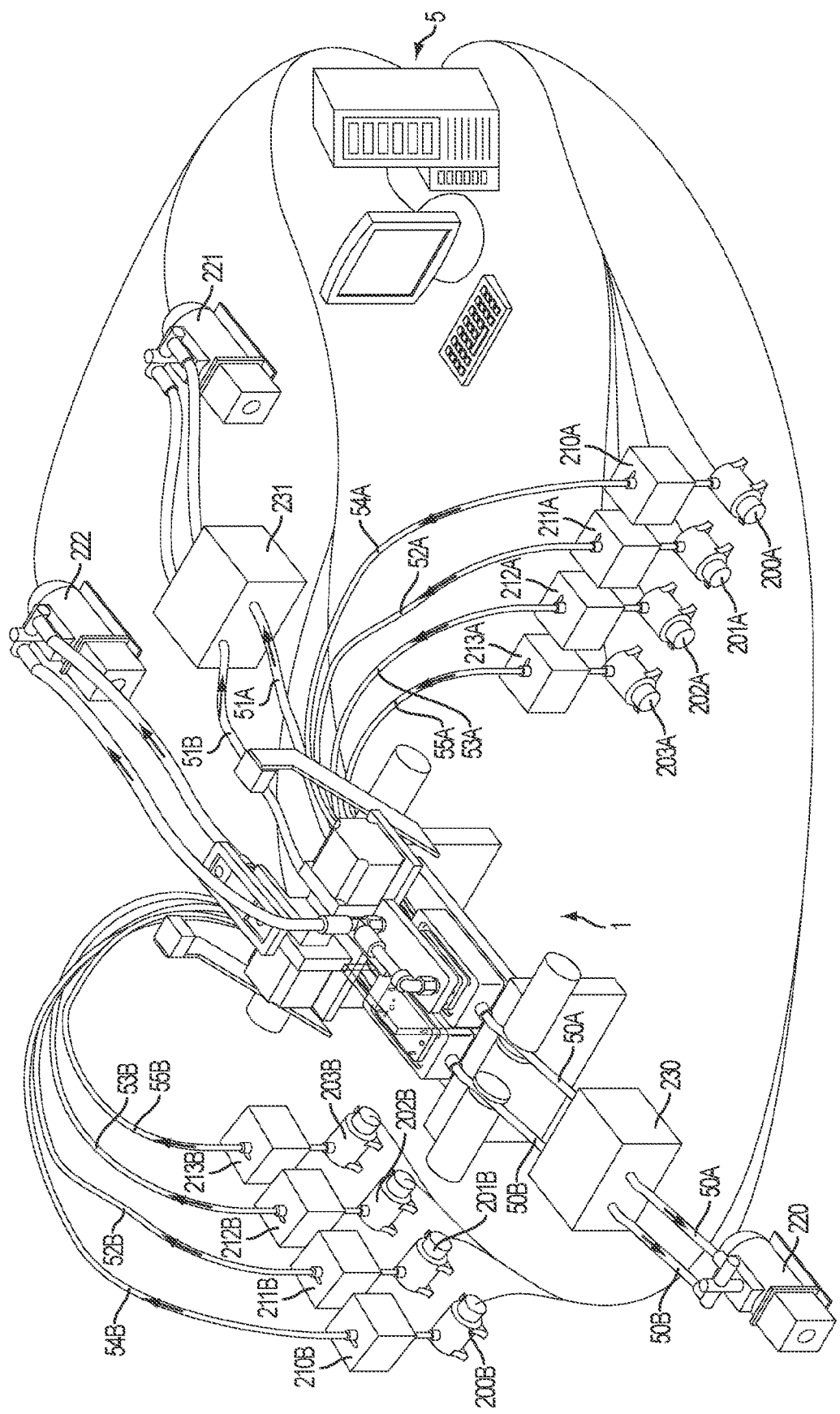

System 1 can include or connect to a control system 5 as shown in FIG. 4, which provides another perspective view of system 1. Control system 5 can include one or more computers each containing a central processing unit capable of executing software instructions stored on computer readable media such as a hard drive, optical drive, or memory. Additionally, control system 5 can include electrical circuitry for executing the software instructions. Control system 5 can include a user interface for receiving user commands to control the operation of system 1. Software stored on or provided to the control system 5, i.e., computer(s), can include programs that control the operation of components of system 1 during sample processing, such as fluid pumps and vacuums. For example, the software can include instructions for directing system 1 to apply various fixatives, stains, and rinses to the sample on the substrate, and to perform several agitation steps during sample processing.

In addition, the software can include default settings, and the user interface may contain customization features for providing the user with the ability to change these defaults settings. For example, the user interface can contain customization features for allowing a user to customize the speed, frequency, or order of fixing, staining, and rinsing phases, as well as agitation parameters (further described below). Control system 5 can also communicate via a network protocol (such as Appletalk®, IPX, TCP/IP, Bluetooth®). For example, the network protocol may use cables (such as twisted pair cables) and/or a wireless connection such as WiFi and/or Bluetooth®. Control system 5 may be connected to a laboratory information system using the network protocol. The laboratory information system can contain a server and/or database for storing information relating to samples processed by system 1. For example, the database may contain a table that provides information about the person or source of the sample (e.g., name, date of birth (DOB), address, time sample was taken, gender, etc.), information relating to processing of the sample (processed on date ##/##/####, sample number #, etc.), a copy of any images acquired of the sample, and copies of any results obtained by analyzing the images.

Referring to FIG. 1, system 1 can include supports 110A and 110B to secure sample handling module of system 1 shown in FIG. 1 to a location within a system or a laboratory workstation. System 1 also includes one or more substrate arms 10A and 10B, each connected at their base to an actuator 30A and 30B. The opposite ends of the substrate arms 10A and 10B include substrate grippers 20A and 20B for receiving and holding substrates during sample processing. Each substrate gripper 20A and 20B receives and holds a substrate 2 while system 1 completes sample processing steps (described below). The substrate may be or include a microscope slide, a cover slip, or other transparent material suitable for holding a sample during sample processing and microscopic examination after sample processing. The substrate can be formed from one or more materials that may or may not be transparent to radiation within at least the visible portion of the electromagnetic spectrum. Examples of such materials include, but are not limited to, various glasses, quartz, fused silica, and a variety of polymers, some of which may be transparent.

The embodiment of FIG. 1 shows a glass microscope slide, substrate 2, which includes a biological sample 3. Using suction ports, substrate grippers 20A, 20B can hold the substrate 2 to substrate arms 10A, 10B during sample processing. A suction tube 23 provides suction to the substrate grippers 20A and 20B through suction ports 21A and 21B, and 22A and 22B (note that ports 21A and 22A are positioned behind substrate 2 in FIG. 1, and are shown in dashed lines).

The embodiment shown in FIG. 1 is a dual substrate system, capable of holding and processing a substrate on each of substrate arms 10A and 10B. Other embodiments provide for processing a single substrate or three or more substrates, sequentially or simultaneously. Further, while the embodiments depicted in FIG. 1 uses suction to attach the substrates 2 to the substrate arms 10A and 10B, other embodiments can use various types of clamps, fingers, or magnets (if the substrate is magnetized) to attach a substrate 2 to a substrate arm 10A during sample processing.

Figure 5:
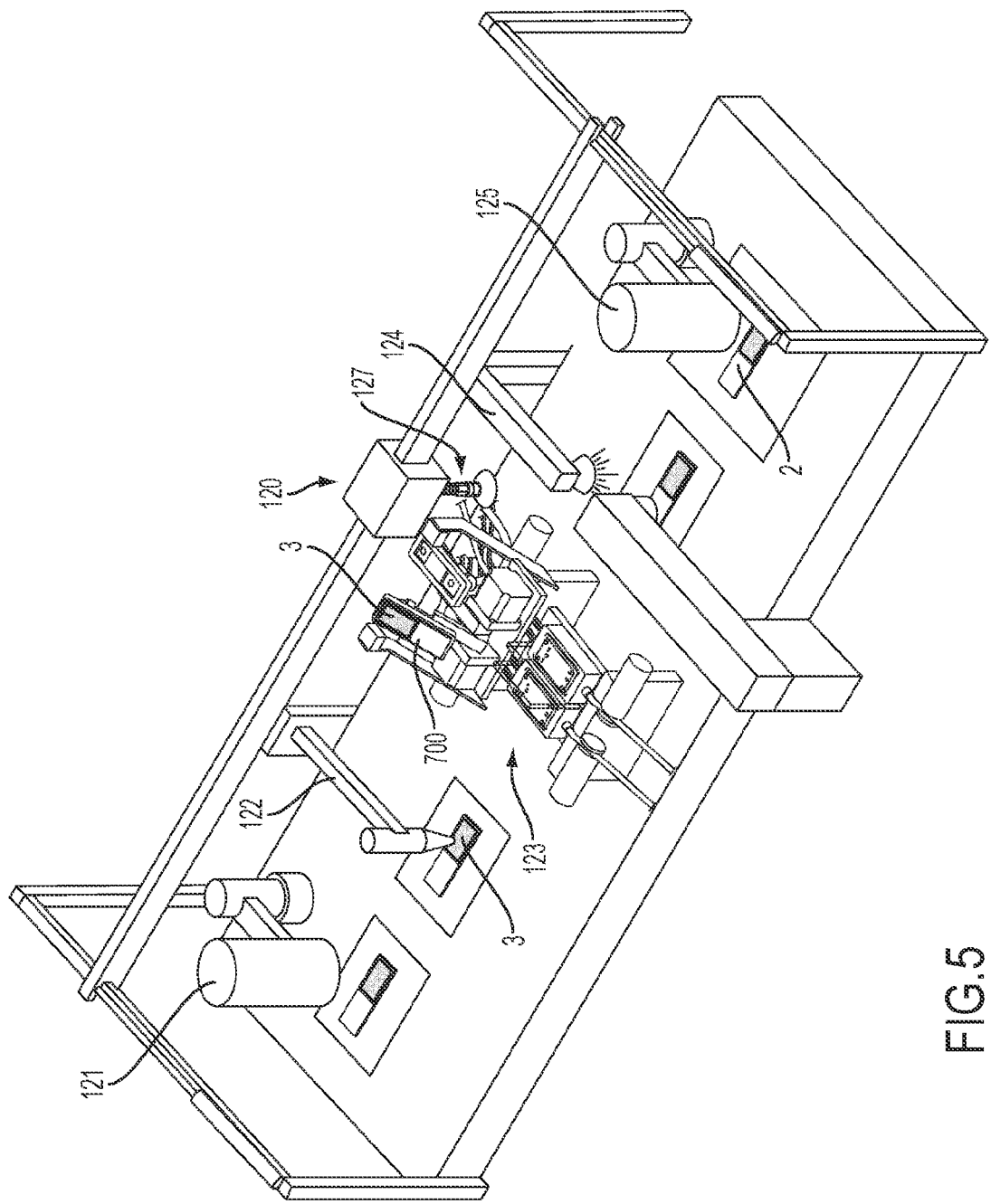
FIG. 5 is a schematic diagram of an automated specimen processing system.

In the embodiments shown in FIG. 5, system 1 receives a substrate 2 carrying a sample 3 from an automated substrate mover 120 or manually from an individual. As an example, the substrate mover 120 can be a device that transports a substrate between stations (e.g., station 121 to station 122, to station 123, to station 124, and to station 125). FIG. 5 shows a system having a first label reader station 121, an applicator station 122, a staining station 123 that includes system 1, an imaging station 124, and a second label reader station 125. The first label reader station 121 is configured to read information from substrate 2 such as a bar code and/or "fingerprint" information that is used to identify the particular substrate 2 and sample 3 thereon. The second label reader station 125 functions in the same manner, and the information it reads is used to verify that the sample 3 that is imaged at imaging station 124 is the same as the substrate that was processed.

Alternatively, in some embodiments, system 1 includes only a single label reader station. For example, first label reader station 121 may not be present in system 1, which can instead include a printing station positioned between imaging station 124 and label reader station 125 (the printing station is not shown in FIG. 5). After substrate 2 is imaged at station 124, the printing station labels the substrate (e.g., by printing a label on the substrate using a dot matrix print head), and then label reader station 125 reads the label applied by the printing station to verify that the sample 3 that was imaged at imaging station 124 corresponds to the labeled substrate 2. In general, embodiments of system 1 can include a single label reader station, multiple label reader stations, or even no label reader stations.

Substrate mover 120 can include a gripper 127 for holding the substrate 2, and registration circuitry or software to enable the mover 120 to determine whether the substrate 2 is mounted in the mover 120. In some embodiments, substrate mover 120 can include a hydraulic cylinder for moving substrate 2 from a first station, i.e., first label reader station 121 to a second station, i.e., applicator station 122. After sample processing, the substrate mover 120 may remove the processed substrate 2 from staining station 123 and transport the substrate 2 to another station for substrate/sample examination, such as a microscope or imaging station 124. Alternatively, an individual may manually remove a substrate 2 from system 1 after sample processing.

In the embodiment of system 1 shown in FIG. 5, imaging of sample 3 on substrate 2 is performed at imaging station 124. However, in certain embodiments, sample imaging can be performed at different locations. For example, sample imaging can be performed at staining station 123, which can include components such as one or more radiation sources and one or more detectors, and various other optical components, for obtaining sample images. In such embodiments, system 1 may not include a separate imaging station 124, with all of the functions of the imaging station being performed instead at other stations of the system (e.g., at staining station 123).

While system 1 in FIG. 1 is configured to accept and process samples on two substrates, in the following discussion and figures, reference may be made to only one set of components in system 1 (e.g., substrate gripper 20A, actuator 30A, substrate arm 10A, etc.). However, it is to be understood that the same steps, features, and attributes that are disclosed in connection with one set of components can also apply to the other set of components in system 1 (e.g., substrate gripper 20B, actuator 30B, substrate arm 10B, etc.). Thus, while the discussion herein focuses only on one set of components for clarity and brevity, it is understood that machines for sample examination such as system 1 can include two or more than two sets of components, each set having some or all of the features discussed herein.

Figure 7A:
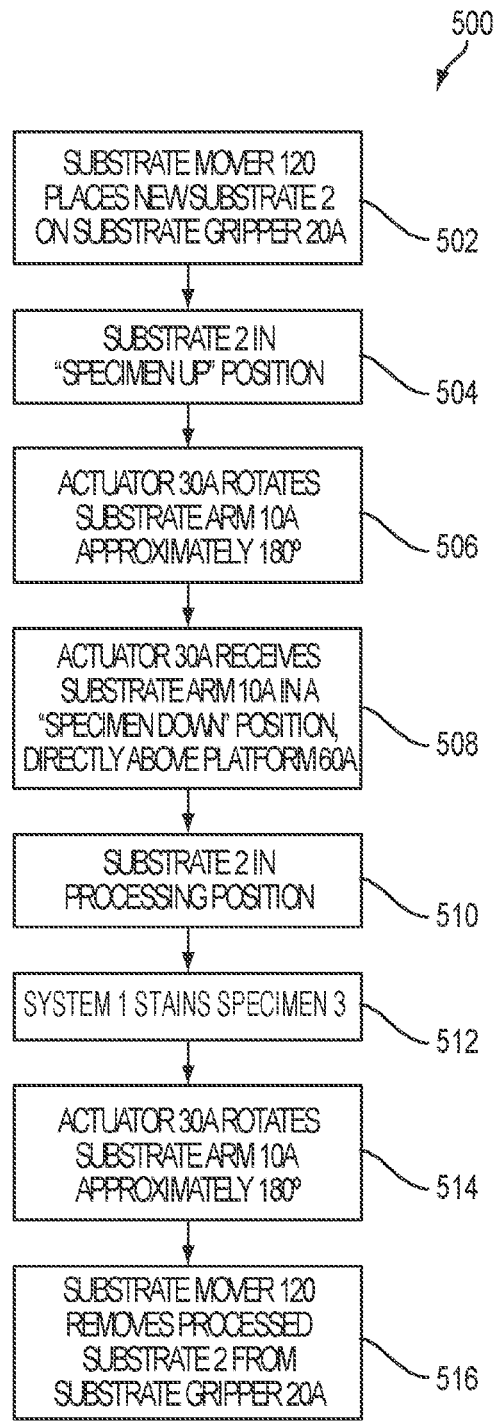
FIG. 7A is a flow chart showing a series of example steps for moving substrate arms from an open position to a processing position.
Figure 7B:
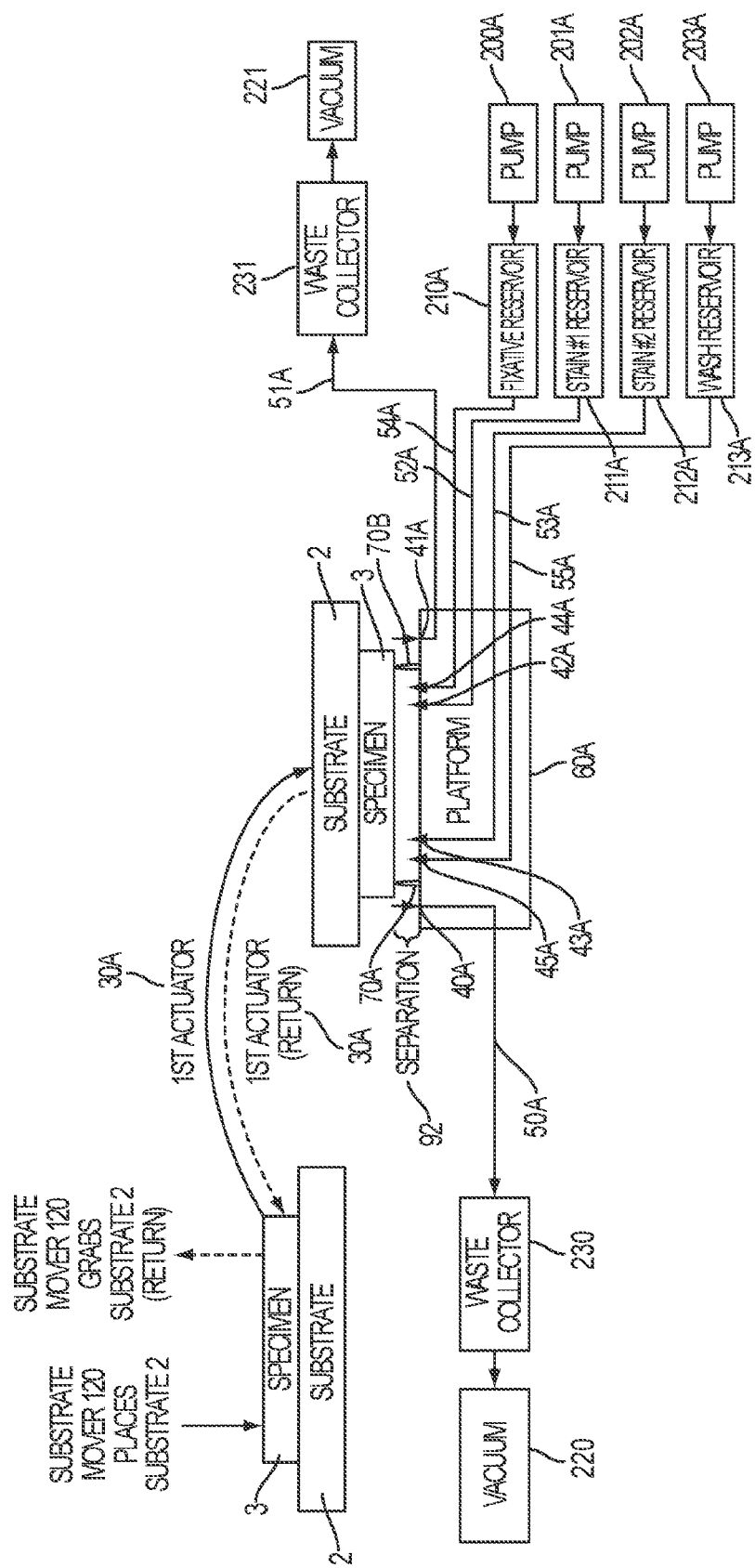
FIG. 7B is a flow chart showing a series of example steps for processing a specimen on a substrate.

FIG. 7A shows a flow chart 500 that includes a series of steps for moving substrate arms from an open position to a processing position. Flow chart 500 is further described below with reference to FIG. 7B, which shows a schematic diagram of system 1. In a first step 502 of flow chart 500, substrate mover 120 places a substrate 2 in contact with a substrate gripper 20A. In step 504, substrate 2 is positioned on the substrate gripper 25A in a "specimen up" or "open" position. Next, in step 506, actuator 30A rotates substrate arm 10A by approximately 180° (see FIG. 7B) to position substrate 2 in a "specimen down" or "sample processing" or "closed" position (step 508), directly above platform 60A, so that substrate 2 is in a processing position in step 510. Rotation of substrate arm 10A in the above manner establishes a defined gap distance or thickness between the surface of substrate 2 on which sample 3 is disposed and the upper surface of platform 60A.

Then, in step 512, system 1 stains sample 3 positioned on substrate 2 by directing suitable fluids including stains, wash fluids, and fixatives to be pumped from reservoirs 210A, 211A, 212A, and 213A into contact with sample 3 through ports 42A, 43A, 44A, and 45A. Excess fluids are removed from sample 3 by vacuum pumping through ports 40A and 41A, and are collected in waste collectors 230 and 231.

In step 514, following staining of sample 3, actuator 30A rotates substrate arm 10A by approximately 180° (reversing the rotation of step 506) to return the substrate to the "specimen up" position. Finally, in step 516, substrate mover 120 removes the processed substrate 2 from substrate gripper 20A. Other open or "specimen up" positions can also be used, provided that an operator or automated substrate mover can load and unload substrates from system 1. For example, the specimen up position can be rotated 100° or more (e.g., 120° or more, 130° or more, 140° or more) from the sample processing position. In some embodiments, the specimen up position can be rotated less than 100° (e.g., less than 90°, less than 80°, less than 70°) from the sample processing position, provided that an operator or substrate mover can load and unload substrates from system 1.

Actuators 30A and/or 30B may include an electric motor, pneumatics, magnetic systems, or other hardware (e.g., a worm gear) to move substrate arm 10A and/or 10B. In addition, system 1 can include one or more sensors configured to provide feedback measurements to control system 5 to ensure that rotation of actuators 30A/30B and substrate arms 10A/10B positions substrates reproducibly with respect to the upper surfaces of platforms 60A/60B, establishing gaps of a consistent thickness between the substrates and the platform surfaces. Such sensors can include, for example, position sensors, and traveling distance sensors that measure relative displacement of substrate arms 10A/10B and/or actuators 30A/30B from an initial position (e.g., the "specimen up" or "open" position).

When substrate arms 10A and 10B are in an open position as depicted in FIG. 1, substrate grippers 20A and 20B can each receive a substrate 2. Once loaded onto a substrate gripper 20A or 20B, actuators 30A and/or 30B then rotate substrate arms 10A and/or 10B, and thus substrate 2, from the open ("specimen up") position to a processing position ("specimen down," as shown for substrate arm 10B in FIG. 3) for application of fixative, stain, and rinse solutions, including agitation steps, and back to an open position for unloading after processing.

Figure 3:
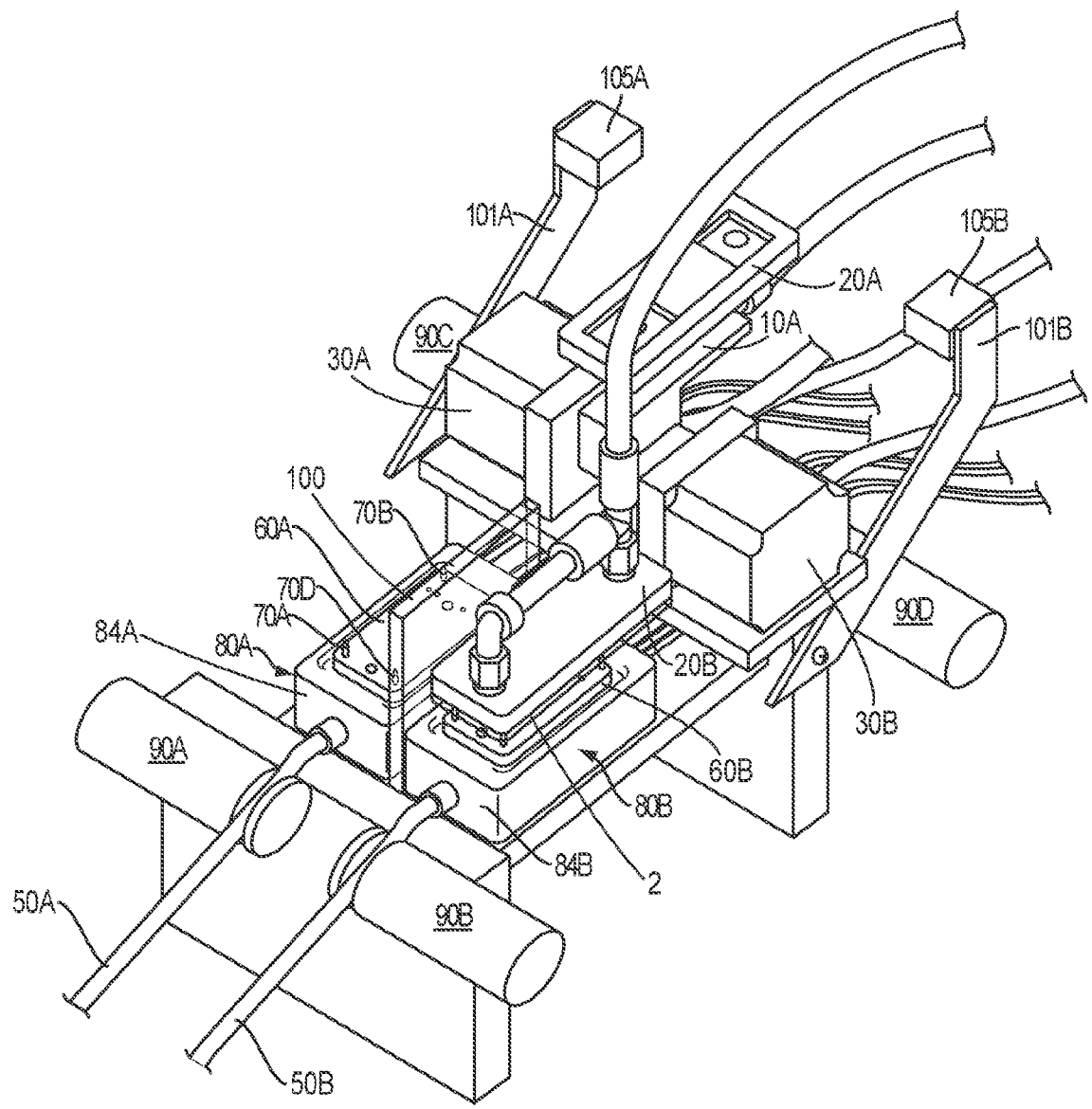

With reference to FIG. 3, actuator 30B has rotated substrate arm 10B from the open position depicted in FIG. 1 to a "closed" or processing position. FIG. 3 shows that the substrate 2 on substrate arm 10B has been flipped over and rotated approximately 180° from its loading position shown in FIG. 1 to a downward-facing position where sample 3 on substrate 2 is substantially parallel to the surface of platform 60B. As discussed in connection with FIG. 7A above, while substrate 2 is positioned proximal to platform 60B in the sample processing position shown, system 1 applies various fixatives, stains, and rinses to sample 3 on substrate 2 through several processing phases, which will be described in greater detail below. To remove substrate 2 from the processing position, actuator 30B rotates substrate arm 10B back to the open position shown in FIG. 1 (both arms) and FIG. 3 (where only substrate arm 10A is in the open position).

In certain embodiments, control system 5 can detect the position of the substrate arms 10A and/or 10B utilizing one or more sensors 105A and 105B to detect indicator arms 101A and 101B (as shown in FIGS. 1 and 3). Sensors 105A and 105B can be proximity sensors, e.g., photoelectric sensors, utilizing, e.g., infrared light or various other technologies (lasers, motion detectors, inductive sensors, capacitive sensors, resistive (i.e., contact) sensors or switches) to detect the presence or absence of the substrate arms 10A and/or 10B. For example, sensors 105A or 105B can have a detection field, and the sensors can determine whether or not a substrate arm (e.g., arm 10A and/or 10B) or a substrate gripper (e.g., gripper 20A and/or 20B) is within the detection field. Control system 5 can receive information from the sensors to determine the positions of substrate arms 10A and/or 10B. For example, when substrate arm 10B (not shown in FIG. 3) is rotated to a processing position, proximity sensor 105B on the proximal end of indicator arm 101B no longer senses target substrate gripper 20B, as target gripper 20B is rotated away from proximity sensor 105B. Accordingly, proximity sensor 105B notifies control system 5 that substrate arm 10B is no longer within its detection field. That is, in this position, proximity sensor 105B on the distal end of indicator arm 101B will not send a positive detection signal to control system 5, because the sensor does not positively detect any target (e.g., a substrate arm or substrate gripper). Control system 5 therefore determines, based on the absence of a positive detection signal from proximity sensor 105B, that substrate arm 10B is in a processing position.

When substrate arm 10B rotates to an open position (as shown in FIG. 1), proximity sensor 105B on the distal end of indicator arm 101B senses target substrate gripper 20B, and notifies control system 5 that substrate arm 10B is rotated to an open position. Stated differently, when substrate arm 10B has rotated away from the sensor 105B, the sensors send a "not present" signal to the control system 5. When substrate arm 10B is rotated into the open position, substrate arm 10B is closer to the sensor 105B, and the sensor can send a "present" signal to the control system 5. In alternate configurations, the sensor can be mounted on substrate arm 10B and can detect the presence of the indicator arm 101B. In some embodiments, control system 5 can be used to calibrate the position of actuators 30A and 30B to known open and sample processing positions, and/or to actively monitor the movement and position of substrate arms 10A and 10B based on control signals and/or feedback received from actuators 30A and 30B.

Figure 2:
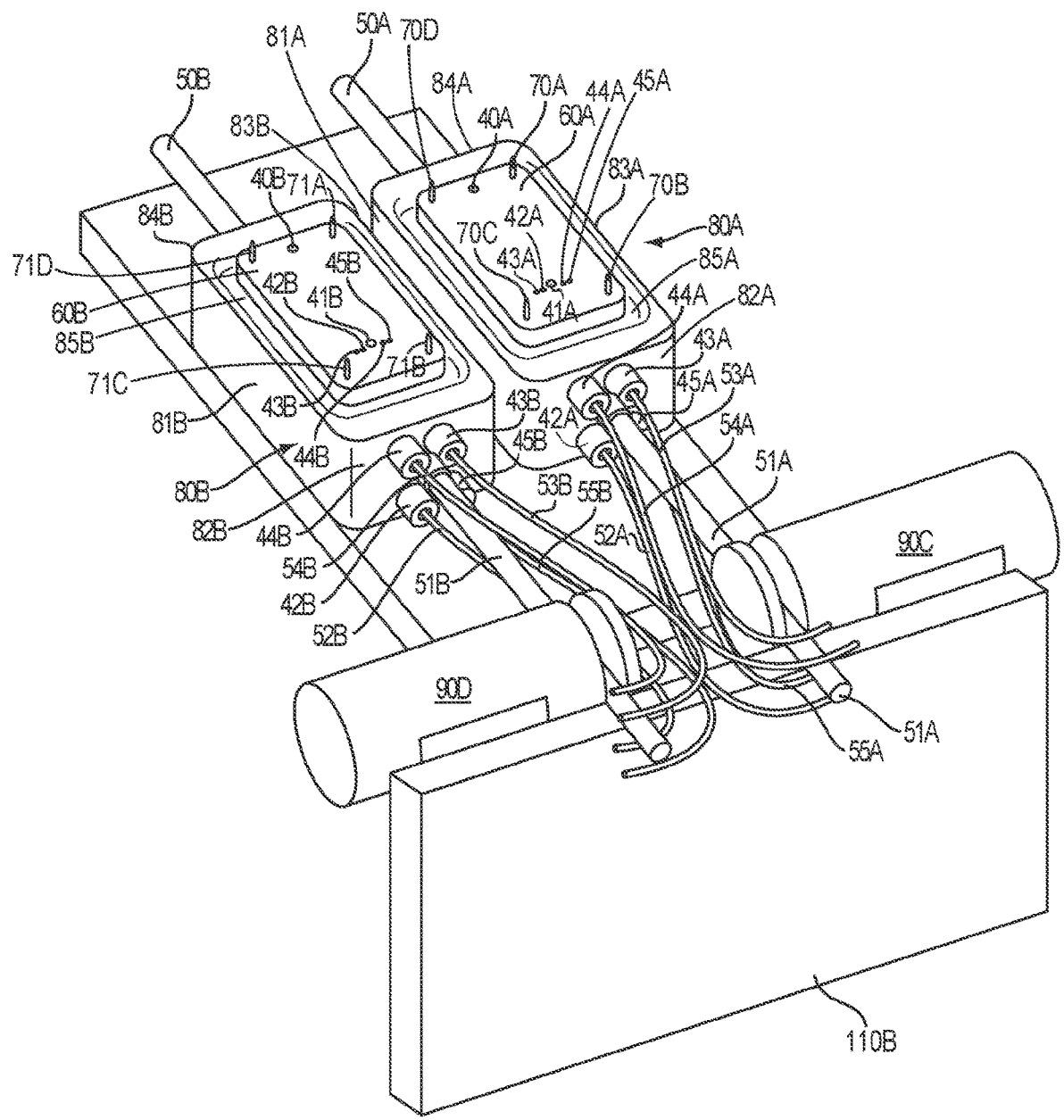
Figure 6:
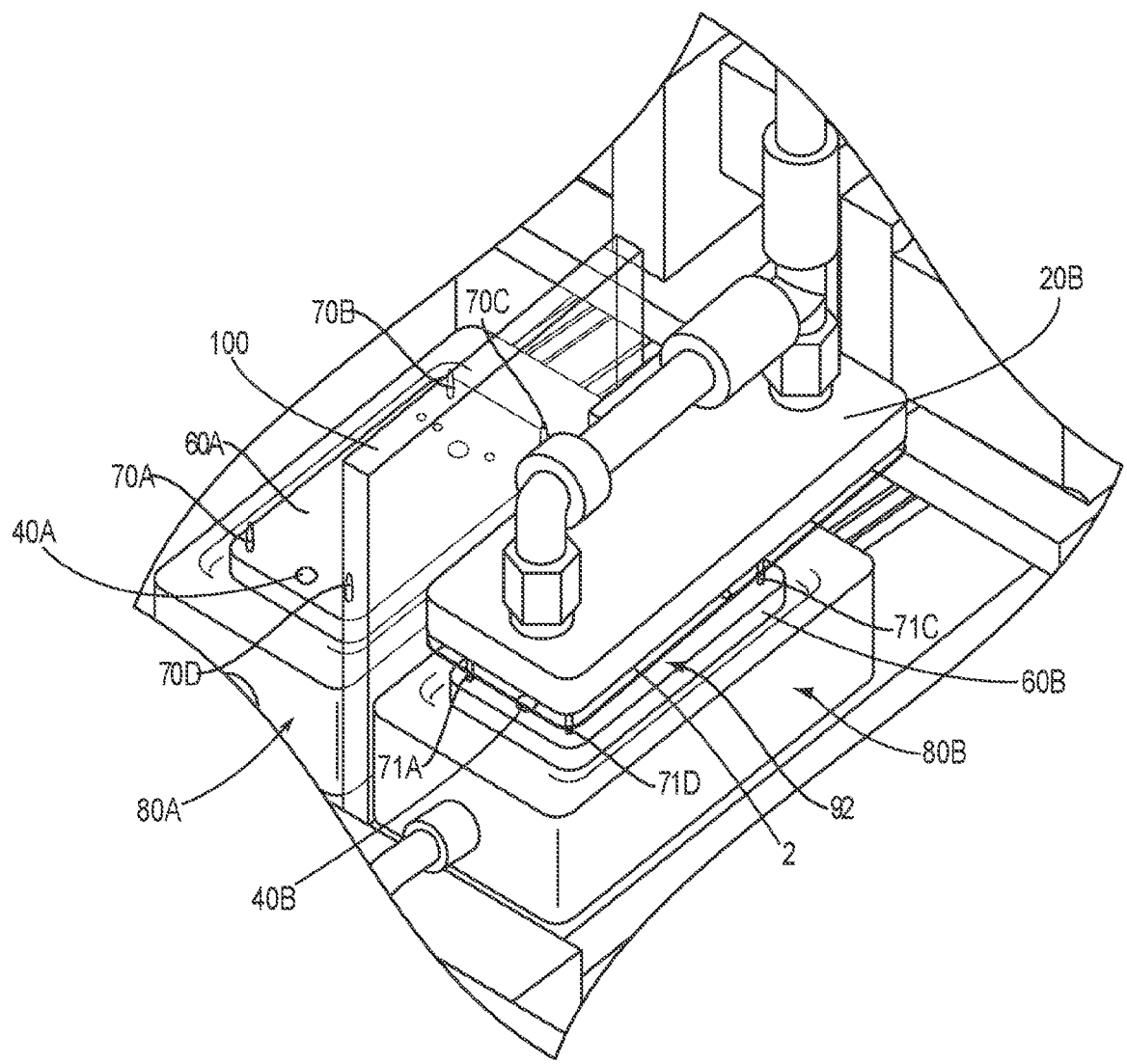
FIG. 6 is a schematic diagram showing a portion of a system for processing substrate-mounted specimens.

In general, system 1 may include one or more (e.g., two, three, four, five, or more than five) platforms 60A and 60B as shown in FIG. 1 for sample processing. As shown in FIG. 2, platform 60A can include lateral sides for supporting a top side of the platform. A shield 100, shown in FIGS. 1, 3 and 6 can be positioned between the platforms 60A and 60B to prevent fluids from splattering between the platforms 60A and 60B. In some embodiments, shield 100 can be formed from a transparent material that blocks fluids from one of platforms 60A and 60B from contaminating the other platform. In certain embodiments, shield 100 can be formed from a material that is translucent or opaque. In FIGS. 1, 3 and 6, shield 100 is depicted as being formed from a transparent material to allow other components positioned behind shield 100 to be shown in the same figure. Shield 100 could also have been shown as being formed from an opaque material, in which case portions of some components such as platform 60A and block 80A would have been obscured.

For systems having two platforms 60A and 60B as shown in FIG. 1, substrates 2 are typically provided to, and from, the substrate mover 120 in an alternating manner. In some embodiments, a first substrate 2 is provided from the substrate mover 120 to a first substrate gripper 20A, to be processed at a first platform 60A, while the system 1 is in a first position. While the first substrate 2 is processed at the first platform 60A, the indexing mechanism 50A can translate the system 1 to a second position so that a second substrate gripper 20B can receive a second substrate, to be processed at the second platform 60B, from the substrate mover 120. While the second substrate is processed at the second platform 60B, the indexing mechanism 50A can translate the system 1 back to the first position so that the substrate mover 120 can remove the first substrate 2 from the first substrate gripper 20A. Once the substrate 2 is removed from the first substrate gripper 20A, a next substrate can be provided to the first substrate gripper 20A. This method for providing substrates to alternating substrate grippers 20A, 20B can be implemented for more than two (e.g., three, four, five, or more than five) stations or platforms, thereby increasing throughput of samples prepared for further evaluation.

Fluid delivery to sample 3 on substrate 2 occurs through platforms 60A and 60B, which can be attached to blocks 80A and 80B, respectively. Block 80A includes lateral sides 81A-84A supporting a top side 85A as shown in FIG. 2. Blocks 80A and 80B can be made of materials such as metals, ceramics, and/or polymers. Examples of suitable materials include thermoplastic polymer materials such as polyether ether ketone (PEEK), polyether imide (PEI), polyarylether ketone (PAEK), and polyetherketone ketone (PEKK), polyoxymethylene (POM), acetal, polyacetal, polyformaldehyde, and other homopolymers and copolymers. Examples of suitable materials are available under the trade names Celcon®, Ramtal®, Duracon®, Kepital®, Hostaform®, and Delrin®.

Materials such as Delrin® can be used to form blocks 80A and 80B, particularly in embodiments that implement Romanowsky staining of samples. Other materials that can be used in embodiments include metals, and Teflon® brand polytetrafluoroethylene-coated aluminum, steel, or titanium. Metals used to form blocks 80A/80B can be mechanically polished and/or treated with one or more inorganic oxides before they are coated.

Other hydrophobic materials can also be used to form portions of blocks 80A/80B, or the entire blocks. Examples of such hydrophobic materials include mica, various glasses, and Micor.

In some embodiments, platforms 60A and/or 60B can be raised as shown in FIGS. 1-3. Alternatively, in certain embodiments, platforms 60A and/or 60B can be flush with the upper surface of blocks 80A and 80B, respectively.

As shown in FIGS. 1 and 2, platform 60A can include offsets 70A-70D to provide a separation between the surface of platform 60A and substrate 2, and prevent substrate 2 from contacting platform 60A. Platform 60B can include a corresponding set of offsets 71A-71D. Offsets can include standoffs, pins, pegs, rods, beads, walls, or other structures that provide separation between the surface of platform 60A and/or 60B and substrate 2.

Offsets 70A-70D and 71A-71D ensure that the surfaces of platforms 60A and 60B and substrate 2 remain separated when substrate 2 contacts the offsets, thereby maintaining a space or gap between the surfaces of the platforms and the substrate. The use of offsets 71A-71D ensures that substrate 2 is not drawn into contact with the surfaces of the platforms when fluid is evacuated from the gaps between the substrate and the platform surfaces, and during positioning of substrate 2 relative to the platform surfaces when the substrate is rotated into a "processing" position.

In some embodiments, the surface of substrate 2 that faces the upper platform surface and the upper platform surface are substantially parallel. As used herein, the phrase "substantially parallel" means that two surfaces are exactly parallel or nearly parallel, so that imperfections in the surface flatness of substrate 2 are reduced or eliminated when substrate 2 contacts the offsets. For example, although great care is taken in the production of substrates, certain substrates may have imperfections such as twist and/or non-coplanar corners. In the systems and methods disclosed herein, the use of offsets assists in correcting these imperfections by improving the surface flatness of substrate 2 where needed, orienting substrate 2 in a substantially parallel relationship to platforms 60A and 60B in the process. The phrase "substantially parallel" covers situations in which the two surfaces are not perfectly flat, but the offsets are all the same size or height, so that at least the contact points of a surface of the substrate with the offsets are in the same plane.

In certain embodiments, the surface of substrate 2 that faces the upper platform surface and the upper platform surface are oriented at an angle with respect to one another, so that the gap between the surfaces is wedge-shaped, rather than being of constant thickness. A wedge-shaped gap can provide improved fluid flow between the surfaces in certain embodiments, allowing for better control over fluid delivery into the gap and/or fluid evacuation out of the gap. The angle between the upper platform surface and the surface of the substrate that faces the upper platform surface can be 15 degrees or less (e.g., 12 degrees or less, 10 degrees or less, 8 degrees or less, 5 degrees or less, or even less).

The benefit of maintaining the upper surface of the platform and the surface of the substrate in a reproducible positional relationship in the processing position is that the volume enclosed between these two surfaces is thus defined and can be precisely controlled. If the two surfaces are not positioned reproducibly, and the angle between them changes, then the volume between them also changes.

As used herein, the phrase "substantially parallel" means that two surfaces are exactly parallel or nearly parallel, so that imperfections in the surface flatness of substrate 2 are reduced or eliminated when substrate 2 contacts the offsets. For example, although great care is taken in the production of substrates, certain substrates may have imperfections such as twist and/or non-coplanar corners. In the systems and methods disclosed herein, the use of offsets assists in correcting these imperfections by improving the surface flatness of substrate 2 where needed, orienting substrate 2 in a substantially parallel relationship to platforms 60A and 60B in the process. The phrase "substantially parallel" covers situations in which the two surfaces are not perfectly flat, but the offsets are all the same size or height, so that at least the contact points of a surface of the substrate with the offsets are in the same plane.

FIG. 6 shows substrate 2 with sample 3 (sample not shown), substrate gripper 20B, blocks 80A, 80B, platforms 60A, 60B, offsets 70A-70D and 71A-71D, and gap 92 between substrate 2 and platform 60B (note that offset 71B is obscured due to the perspective of FIG. 6). Gap 92 allows fluids to travel between the surface of platform 60B containing ports 40B-45B (shown in FIG. 2) and substrate 2 containing sample 3. The separation distance required for optimal sample fixing, staining, and rinsing will vary depending on the flow rate of fluids dispensed from ports 42B-45B (and/or ports 42A-45A), port diameter, the viscosity of the fluids applied during processing, and the amount of suction available for removing fluids from the substrate, separation, and platform utilizing, i.e., ports 40B, 41B (and/or ports 40A, 41A).

In some embodiments, for example, offsets providing a gap 92 of about 100-200 microns between the surface of platform 60B and substrate 2 enable fixing, staining, and rinsing for samples comprising blood cells in embodiments capable of dispensing fluids at flow rates ranging from 70 to 140 microliters per second (e.g., 90, 115, or 125 microliters per second) from ports 40B-45B having a diameter ranging from 500 to 1,500 microns. In general, the size or height of gap 92 can vary from about 50 microns to 1,000 microns for certain embodiments (e.g., from about 50 to 500 microns, from about 75 to 250 microns, from about 100 to 200 microns), provided such embodiments are capable of overcoming surface tension from fluids in the separation while dispensing and removing fluid during sample processing.

In general, the diameters of ports located on platform 60A and/or 60B can vary from about 125 microns to 5,000 microns. In certain embodiments, the diameters of the ports are all the same. In some embodiments, however, the diameters of some of the portions can differ. Individual ports and/or groups of ports can have different diameters depending on the nature of the fluid delivered through them. Stain ports, for example, may have diameters that are larger or smaller than ports that deliver fixative and/or rinsing solutions based on the volumes of these different types of solutions that are delivered and the duration of the time periods during which they are delivered.

System 1 includes a series of ports and tubes for dispersing and removing fluids applied during sample processing. The following discussion describes various ports, tubes, and other components associated with platform 60A, but similar considerations apply to platform 60B and its associated components. FIG. 2 shows a close up view of the system shown in FIG. 1, and shows in detail ports 40A-45A on platform 60A and tubes 50A-55A connected to block 80A. Tubes 52A-55A distribute certain fluids including one or more fixatives, stains, and rinse solutions across the platform 60A, into the separation, and onto the substrate.

Referring to FIG. 2, the top side of platform 60A includes six ports 40A-45A that are connected to tubes 50A-55A. Fluids are driven by one or more pumps through the tubes and ports onto substrate 2. One or more fluid reservoirs 210A-213A (such as a first stain reservoir 211A, a second stain reservoir 212A, a fixative reservoir 210A, and a rinse solution reservoir 213A), e.g., as shown in FIG. 4, can direct fluid onto platform 60A and substrate 2. The diameters of ports 40A-45A shown in FIGS. 1-3 range from approximately 500 microns to 1,500 microns, although the diameters can also be smaller or larger in certain embodiments. In some embodiments, the diameters of the vacuum ports 40A and 41A are more than twice the diameters of fluid ports 42A-45A.

Each of ports 40A-45A is typically dedicated to a particular fluid or vacuum source. Alternatively, more than one port may be used for each fluid or vacuum source, or multiple tubes from various fluid and vacuum sources may connect to a single port located on platform 60A. For example, in some embodiments, only one port on platform 60A may be used for waste removal, but when using more viscous fluids, the single port may not provide sufficient suction to evacuate residual fluid from the platform. Thus, it may be desirable in certain embodiments to provide two suction ports at different positions on the platform (e.g., one suction port at each end of the platform) for removing excess stain, fixative, and rinse fluids as shown with ports 40A and 41A in FIG. 2. Further highlighting the variability of fluid-to-port configurations, in certain embodiments, a single port on platform 60A may be dedicated for a particular stain, while in other embodiments multiple ports are used for applying stains during sample processing. Indeed, various combinations relating to the number of ports, port locations, and fluids assigned to each port and fluid tube may be used in different embodiments of the invention.

Ports 40A-45A can generally be positioned as desired on platform 60A to provide for fluid delivery to, and fluid removal from, substrate 2. Typically, each of the fluid ports is positioned on platform 60A such that the port's aperture is not positioned directly adjacent or beneath sample 3 on substrate 2 when the sample is undergoing processing. With certain combinations of samples and stains, for example, if stains are dispensed from a port located directly adjacent or beneath a portion of sample 3, a larger quantity of stain may be applied to cells in that portion (in the vicinity of the port) than to cells in other portions of the sample. As a result, cells receiving the larger quantity of stain may appear darker in sample images, and this non-uniform staining of sample cells can complicate manual and automated evaluation of the sample and introduce errors into diagnostic measurements and analytical outcomes based on the images. Thus, fluid ports that deliver stain to sample 3 can be spaced a certain distance from the sample-containing area of the substrate 2, e.g., a slide, to improve staining results.

In addition, the use of pairs of ports, e.g., multiple pairs of ports, located opposite each other, can also improve staining uniformity. For example, in some embodiments, two ports are used to deliver stain to sample 3. The two ports can be located on platform 60A at positions spaced a certain distance (e.g., are offset) from the edges of sample 3, and located opposite each other in a direction parallel to the short edges 7 of platform 60A. When stain is dispensed from the two spaced ports, a relatively uniform quantity of stain is deposited on the cells in different regions of sample 3, and improved staining homogeneity is observed in sample images.

Similarly, while waste removal ports 40A and 41A, can generally be positioned as desired to remove excess fluids from the surface of substrate 2 using one or more vacuum sources, in some embodiments ports that are used for fluid removal are spaced at a distance from positions on platform 60A that are directly beneath cells within sample 3 on substrate 2. Positioning waste removal ports in this manner (i.e., not directly opposing a portion of sample 3) reduces the chances that when such ports are actuated to evacuate fluids from substrate 2, cells from sample 3 are inadvertently damaged or drawn into the fluid waste removal ports. In certain embodiments, due to the difference in lengths of the long and short sides of platform 60A, the waste removal ports are spaced apart from the edge of the sample area and arranged opposite each other along a direction parallel to the long edges 9 of platform 60A.

In some embodiments, one or more additional waste removal ports can be positioned in the top sides 85A and 85B of blocks 80A and 80B, which form troughs surrounding platforms 60A and 60B (shown in FIG. 2). During fluid delivery and evacuation from gap 92, excess fluid can leak into the troughs. This excess fluid can be removed through additional waste removal ports in top sides 85A and 85B.

Additional aspects of system 1 and steps for applying fluids to sample 3 on substrate 2 are disclosed in U.S. Pat. No. 8,454,908, the entire contents of which are incorporated herein by reference.

Composite Platforms

To achieve consistent, reliable processing of sample 3, particularly when one or more stains are applied to the sample 3 (e.g., a single stain applied multiple times to the sample, or multiple stains each applied one or more times to the sample), fluids used for sample processing should be applied to the sample 3 while fluid leakage out of gap 92 is minimized. As discussed above, a combination of pump pressure and capillary force is used to fill gap 92 (which has a thickness of between 180 microns and 200 microns, e.g., approximately 190 microns) with a processing fluid such as a staining fluid. Capillary force maintains the fluid within gap 92 between the substrate and the upper surface of the platform, and bounded by the edges of the substrate, restricting leakage of the fluid out of gap 92.

During various processing steps, the fluid in gap 92 can optionally be agitated (e.g., by cyclically changing the distance between substrate 2 and platform 60A or 60B) to improve the homogeneity of the fluid distribution within gap 92 and/or eliminate temperature gradients that may arise due to the introduction of fluid into gap 92. It should be noted, however, that agitation is not necessary, and introduces the possibility of fluid leakage out of gap 92. Additional aspects of delivering fluid into gap 92 are disclosed, for example, in U.S. Patent Application Publication No. 2016/0018302, the entire contents of which are incorporated herein by reference.

During all processing steps, including optional agitation, even relatively small misalignments, on the order of 10 microns, between substrate 2 and the upper surface of platform 60A or 60B can lead to leakage of fluid out of gap 92, due to non-homogeneous capillary force distribution within gap 92. Such leakage can lead to inconsistent staining of sample 3, as inconsistent quantities of stain and/or other fluids may contact sample 3 during processing. In addition, leakage may also lead to fluid contacting the edges of the substrate, which can result in incomplete fluid evacuation from gap 92, and eventual contamination of the system.

In addition, when the upper surface of platform 60A or 60B that faces substrate 2 is formed from a hydrophobic material, fluid transport across the surface (e.g., the flow of staining solution) may not always be smooth. If fluid flow is not smooth, variations in the staining of sample 3 can occur, as the stain solution may not be uniformly delivered to the sample.

The following discussion refers to various features of platform 60A. However, it should be understood that the discussion applies equally to platform 60B and corresponding features thereof. Systems that include both platforms 60A and 60B can include some or all of the features discussed below implemented on one or both platforms.

Figure 8:
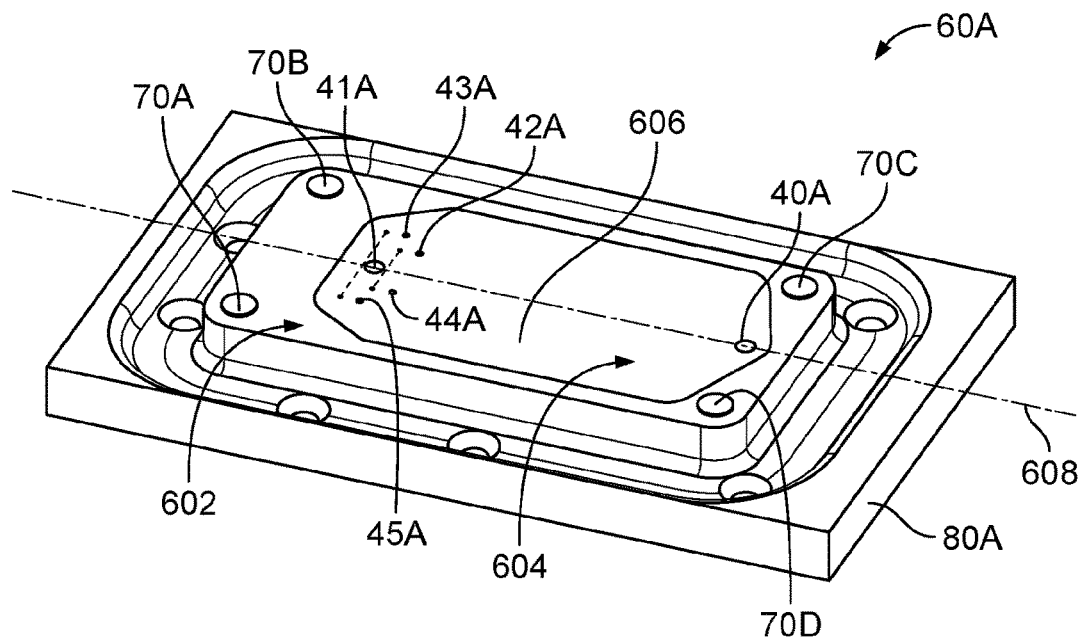
FIG. 8 is a schematic diagram of an embodiment of a fluid delivery platform.

To achieve improved fluid retention and distribution within gap 92, a schematic diagram of an embodiment of platform 60A is shown in FIG. 8. Platform 60A includes a first surface 602 that faces substrate 2 when the substrate is in the "processing" position, and a fluid delivery area 604 with a second surface 606. To achieve improved fluid retention within gap 92, platform 60A is formed as a composite structure. First surface 602 is formed of a first material having hydrophobic properties, while second surface 606 is formed of a second material having hydrophilic properties. In this manner, fluid delivered into fluid delivery area 604 through one or more of ports 42A-45A flows easily across second surface 606. However, the hydrophobic first surface 602 discourages fluid from flowing out of fluid delivery area 604, and thereby leaking out of gap 92.

In general, the first material from which first surface 602 is formed has a water contact angle of 100 degrees or more (e.g., 110 degrees or more, 120 degrees or more, 130 degrees or more, 140 degrees or more, 150 degrees or more) to ensure that the first material is sufficiently hydrophobic. Suitable first materials include, but are not limited to, polydimethylacrylamide, polydimethylsiloxane, and fluoropolymers.

The second material from which second surface 606 is formed typically has a water contact angle of 40 degrees or less (e.g., 30 degrees or less, 25 degrees or less, 20 degrees or less, 15 degrees or less) to ensure that the second material is sufficiently hydrophilic. Suitable second materials include, but are not limited to, mica, glass, glass-ceramic composite materials such as Macor®, glass coatings, metals, oxides, and nitrides.

In certain embodiments, fluid delivery area 604 is implemented as a recess within first surface 602. Alternatively, in some embodiments, fluid delivery area 604 is implemented as a raised area relative to first surface 602. That is, second surface 606 is closer to substrate 2 than first surface 602 when the substrate is in the processing position. Fluid delivery area 604 can be implemented in such a manner, for example, when a coating or film of one or more of the second materials is applied to the first material.

In some embodiments, first and second surfaces 602 and 606 are at essentially the same distance from a substrate in the processing position. For example, second surface 606 can be formed by oxidizing or otherwise treating a portion of first surface 602 to create the second surface. Chemical methods (e.g., using chemical oxidizing agents) and physical methods (e.g., exposing first surface 602 to UV radiation and/or a plasma) can be used to treat first surface 602 to form the second surface.

In some embodiments, to ensure fluid retention within gap 92, a difference between the water contact angle of the first material and the water contact angle of the second material is 50 degrees or more (e.g., 60 degrees or more, 70 degrees or more, 80 degrees or more, 90 degrees or more, 100 degrees or more). In general, the larger the difference between the water contact angles of the first and second materials, the greater the degree to which fluids such as staining solutions are discouraged from flowing into portions of gap 92 that are above first surface 602 of platform 60A.

The composite structure of platform 60A can be implemented in a variety of ways. In some embodiments, for example, platform 60A is fabricated from a block of the second material, such that fluid delivery area 604 is formed in the block. A layer of the first material is disposed on the block of the second material to form first surface 602.

The thickness of the first material layer has been discovered to be an important feature of the composite platforms disclosed herein. In general, if the thickness of the first material layer is too large, then capillary forces within gap 92 are disturbed, leading to increased fluid leakage from gap 92. In particular, during agitation cycles in which the thickness of gap 92 changes abruptly, if the thickness of the first material layer is too large, it has been discovered that capillary forces at the edges of the gap increase, drawing fluid away from the middle region of the gap (i.e., away from the portion of the gap that is above the middle of fluid delivery area 604), resulting in uneven application of stain to sample 3. To avoid such effects, the thickness of the first material layer cannot be too large. Accordingly, the thickness of the first material layer, measured in a direction perpendicular to first surface 602, is generally 100 microns or less (e.g., 80 microns or less, 60 microns or less, 40 microns or less, 20 microns or less, 10 microns or less, 5 microns or less, 1 micron or less, 800 nm or less, 600 nm or less, 400 nm or less, 200 nm or less, 100 nm or less).

As shown in FIG. 8, in some embodiments, platform 60A includes waste removal ports 40A and 41A and fluid inlet ports 42A-45A, which function generally as described elsewhere in this disclosure. However, it has been discovered that the location of fluid inlet ports 42A-45A relative to the location of waste removal port 40A can be important to ensure homogeneous delivery of fluids such as staining solutions into gap 92, and efficient removal of fluids through port 40A. In particular, by positioning ports 42A-45A at angled, offset locations relative to port 40A, improved fluid flow within fluid delivery area 604 and gap 92 can be achieved.

Figure 9:
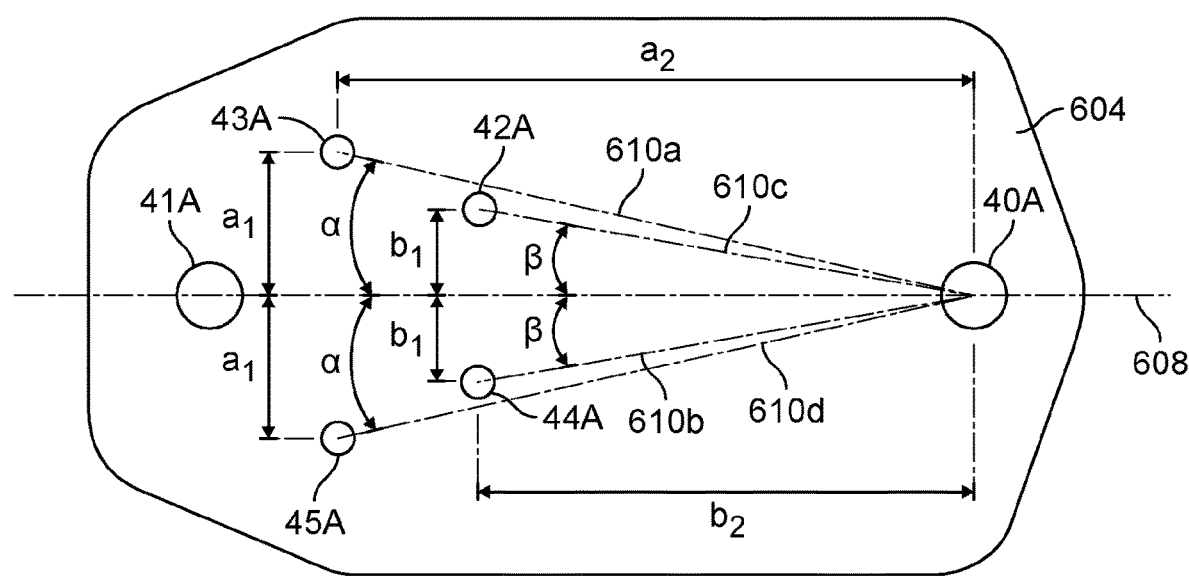
FIG. 9 is another schematic diagram of the fluid delivery platform of FIG. 8.

FIG. 9 shows a schematic top view of fluid delivery area 604. In some embodiments, as shown in FIG. 9, port 40A is positioned on the second surface 606 of fluid delivery area 604, along a central axis 608 of fluid delivery area 604. Ports 43A and 45A are positioned on opposite sides of central axis 608, each at a distance of $a_1$ from axis 608 measured in a direction perpendicular to axis 608, and at a distance $a_2$ from port 40A, measured along a direction parallel to axis 608. Flow axes 610$a$ and 610$d$ extend from ports 43A and 45A to port 40A, respectively. The angle between each of flow axes 610$a$ and 610$d$ and central axis 608 is $\alpha$.

Similarly, ports 42A and 44A are positioned on opposite sides of central axis 608, each at a distance of $b_1$ from axis 608 measured in a direction perpendicular to axis 608, and at a distance $b_2$ from port 40A, measured along a direction parallel to axis 608. Flow axes 610$c$ and 610$b$ extend from ports 42A and 44A to port 40A, respectively. The angle between each of flow axes 610$c$ and 610$b$ and central axis 608 is $\beta$.

In certain embodiments, $\alpha$ is larger than $\beta$. Alternatively, in some embodiments, $\beta$ can be larger than $\alpha$. In general, for example, $\alpha$ can be 15 degrees or less (e.g., 12 degrees or less, 10 degrees or less, 8 degrees or less, 6 degrees or less, 8.3 degrees). In addition, $\beta$ can be 10 degrees or less, 8 degrees or less, 6 degrees or less, 4 degrees or less, 5.3 degrees). Alternatively, in some embodiments, $\beta$ can be larger than $\alpha$.

In some embodiments, $a_1$ is larger than $b_1$. Alternatively, in certain embodiments, $b_1$ can be larger than $a_1$. In general, for example, $a_1$ can be 10 mm or less (e.g., 8 mm or less, 6 mm or less, 5 mm or less, 4 mm or less, 3 mm or less, 2 mm or less, 1 mm or less). In addition, $b_1$ can be 10 mm or less (e.g., 8 mm or less, 6 mm or less, 5 mm or less, 4 mm or less, 3 mm or less, 2 mm or less, 1 mm or less).

In certain embodiments, $a_2$ is larger than $b_2$. Alternatively, in some embodiments, $b_2$ can be larger than $a_2$. In general, for example, $a_2$ can be 10 mm or less (e.g., 8 mm or less, 6 mm or less, 5 mm or less, 4 mm or less, 3 mm or less, 2 mm or less, 1 mm or less). In addition, $b_2$ can be 10 mm or less (e.g., 8 mm or less, 6 mm or less, 5 mm or less, 4 mm or less, 3 mm or less, 2 mm or less, 1 mm or less).

More generally, in certain embodiments, ports 43A and 45A are not positioned symmetrically with respect to port 40A. For example, ports 43A and 45A can be positioned at different distances from central axis 608, at different distances from port 40A, and/or along flow axes at different angles with respect to central axis 608. Similarly, in some embodiments, ports 42A and 44A are not positioned symmetrically with respect to port 40A. For example, ports 42A and 44A can be positioned at different distances from central axis 608, at different distances from port 40A, and/or along flow axes at different angles with respect to central axis 608.

In FIG. 9, ports 40A and 41A are each positioned along central axis 608. More generally, however, either or both of ports 40A and 41A can be displaced from central axis 608 in a direction perpendicular to axis 608. For example, by locating one or both of ports 40A and 41A such that they are displaced from axis 608, a constriction can be formed in fluid located between the ports, which may assist in the removal of fluid through the ports. In particular, locating the ports at non-axial locations can lead to the formation of a non-symmetric constriction at the mid-point between the ports. In some embodiments, either or both of ports 40A and 41A can be displaced from central axis 608 in a direction perpendicular to axis 608 by 2 mm or more (e.g., 3 mm or more, 4 mm or more, 5 mm or more, 6 mm or more, 8 mm or more, 10 mm or more).

The maximum depth of fluid delivery area 604 when implemented as a recess—the maximum distance between the plane defined by first surface 602 and second surface 606 of fluid delivery area 604—can generally be selected as desired based on the thickness of gap 92 and the volume of fluid distributed within the gap. In some embodiments, for example, the maximum depth of fluid delivery area 604 is 200 microns or less (e.g., 180 microns or less, 160 microns or less, 150 microns or less, 140 microns or less, 130 microns or less, 120 microns or less, 100 microns or less).

In some embodiments, second surface 606 of fluid delivery area 604 is planar and nominally parallel to first surface 602. However, in certain embodiments, second surface 606 is not planar, and can have a curved (i.e., convex or concave) shape.

Figure 10:
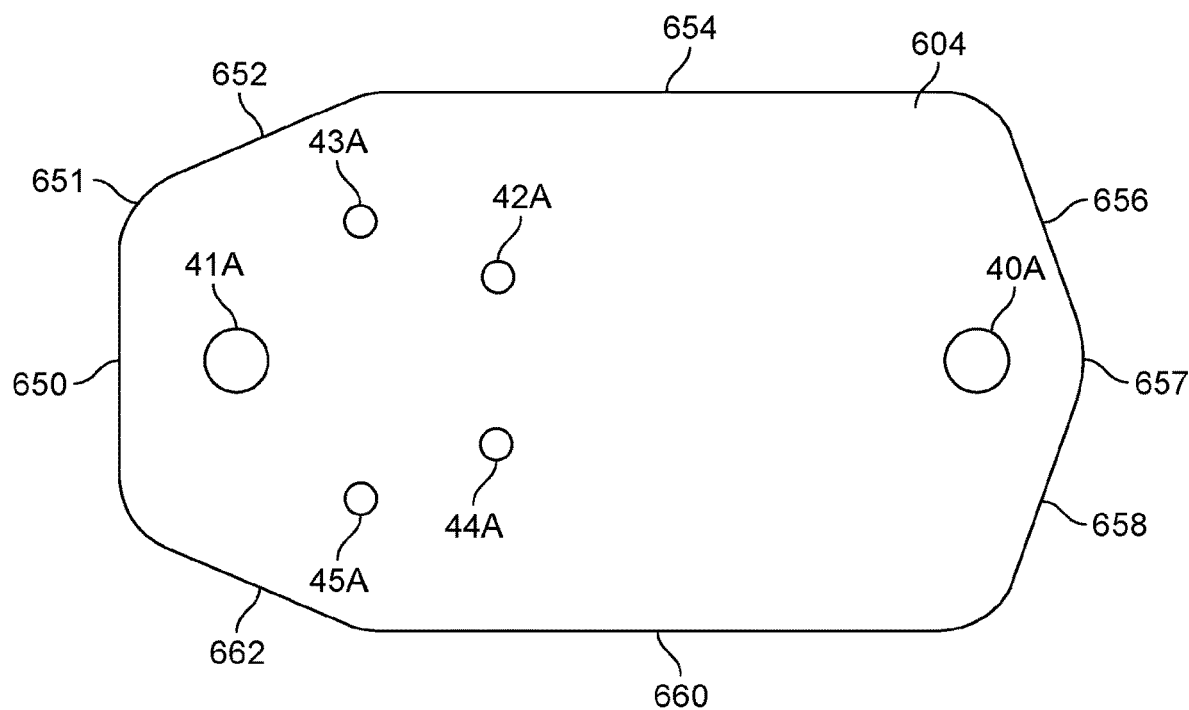
FIG. 10 is a further schematic diagram of the fluid delivery platform of FIG. 8.

FIG. 10 is a schematic diagram showing another top view of fluid delivery area 604. In addition to second surface 606, fluid delivery area 604 is bounded by lateral wall surfaces 650, 652, 654, 656, 658, 660, and 662 that extend between the first surface 602 of platform 60A and second surface 606. It has been discovered that to ensure repeatable and consistent fluid flow within fluid delivery area 604, elimination of "dead volumes" is important. Dead volumes correspond to regions within fluid delivery area 604, typically formed by corners between walls that intersect at shallow angles, into which fluid flow can be impaired and/or from which fluid evacuation can be difficult. Dead volumes can cause incomplete filling of gap 92 with fluid and/or incomplete draining of fluid from within gap 92, thereby leading to non-homogeneous processing of samples (e.g., non-homogeneous staining), and potential leakage of fluid out of gap 92 due to overfilling of the gap with new fluid when the prior fluid is not fully removed from the gap.

To eliminate dead volumes within fluid delivery area 604 and ensure consistent fluid flow, lateral wall surfaces 650, 652, 654, 656, 658, 660, and 662 can be positioned in specific arrangements relative to one another. For example, as shown in FIG. 10, in some embodiments, the lateral wall surfaces are positioned so that each pair of adjacent wall surfaces subtends an angle of more than 70 degrees (e.g., more than 80 degrees, more than 90 degrees, more than 100 degrees, more than 110 degrees, more than 120 degrees). To further reduce dead volumes in fluid delivery area 604, in some embodiments, each pair of adjacent lateral wall surfaces blend along a rounded fillet. For example, as shown in FIG. 10, surfaces 650 and 652 do not intersect along a line, but instead blend into one another along a filleted corner 651. In general, rounded corners reduce the "pinning" effect of the fluid meniscus. When lateral wall surfaces meet at a sharp line or corner, fluid within the corner forms a meniscus with a relatively smaller radius (i.e., matching the geometry of the corner). Because capillary forces—which are responsible for fluid stabilization—are higher for smaller meniscus radii, the fluid shows a higher tendency to become trapped in sharp corners. In contrast, when lateral wall surfaces blend along a rounded fillet, the meniscus adopted by fluid in the vicinity of the fillet has a relatively larger radius, reducing capillary forces within the fluid, and making the fluid easier to remove.

The transverse shape of second surface 606 can generally be selected as desired to accommodate fluid inlet and outlet ports and to promote repeatable, consistent fluid flow within the recess. In some embodiments, for example, second surface 606 has a heptagonal transverse shape, as shown in FIG. 10. In general, the lengths of the lateral wall surfaces can all be the same or, alternatively, the lengths of some of the lateral wall surfaces can be different, as in FIG. 10.

Fluid delivery area 604 shows one example of relative orientations and sizes of lateral wall surfaces. Lateral wall surfaces 654 and 660 are parallel, while wall surface 650 is orthogonal to both surfaces. Lateral wall surfaces 652 and 662 extend between wall surface 650 and wall surfaces 654 and 660, respectively. Lateral wall surfaces 656 and 658 extend from surfaces 654 and 660, respectively, and intersect at a rounded corner 657.

In FIG. 10, the specific lengths and orientations of the lateral wall surfaces are selected to promote fluid delivery from ports 42A-45A, and fluid evacuation through ports 40A and 41A. To that end, ports 42A-45A are positioned closer to lateral wall surface 650 than to either of lateral wall surfaces 656 and 658, while port 40A is positioned in proximity to corner 657 formed by the intersection of surfaces 656 and 658. Various fabrication methods can be used to apply the layer of the first hydrophobic material onto a block of the second hydrophilic material to form first surface 602. In some embodiments, for example, the layer of hydrophobic material can be applied using a hot embossing procedure as described, for example, in Chen et al., "Fabrication of Switches on Polymer-Based by Hot Embossing," *DTIP of MEMS and MOMS*, Stresa, Italy (2006), the entire contents of which are incorporated herein by reference. In this procedure, the block of hydrophilic material and the layer of hydrophobic material are mounted on plates, and pressed together at high temperature, after which the bonded structure is cooled.

In certain embodiments, the layer of hydrophobic material can be chemically coated onto the block of hydrophilic material. That is, the hydrophobic material can be deposited on the hydrophilic material by spraying or by performing wet chemical bonding. In some embodiments, bonding methods used in conventional microfabrication can be adapted to apply the layer of hydrophobic material to the hydrophilic block. For example, polydimethylsiloxane (PDMS) can be bonded to glass-ceramic composite materials using a variety of surface treatment methods to form a strong, permanent bond between the PDMS layer and the block. Examples of such methods are disclosed in the following references, the entire contents of each of which are incorporated herein by reference: Nugen, S. R., et al., "PMMA Biosensor for Nucleic Acids with Integrated Mixer and Electrochemical Detection," *Biosensors and Bioelectronics* 24(8): 2428-2433 (2009); and Shiu, P. P., et al., "Rapid Fabrication of Tooling for Microfluidics Devices Via Laser Micromachining and Hot Embossing," *Journal of Micromechanics and Microengineering* 18(2): 025012 (2008).

In some embodiments, the layer of hydrophobic materials can be formed on the hydrophilic material using one or more physical methods such as evaporation, sputtering, airbrushing, painting, printing, exposure to UV radiation, and plasma exposure.

By using platform 60A discussed in this section, a number of advantages can be realized. In particular, processing fluids such as staining solutions can be delivered into gap 92 with improved homogeneity, resulting in more uniform application of processing steps to sample 3, and fewer non-systematic processing artifacts in the sample. Improved evacuation of processing fluids through waste removal ports can also be achieved.

Further, by reducing or preventing leakage of fluid from gap 92, a reduction in reagent volumes consumed can be realized. For example, by using platform 60A shown in FIG. 8 instead of platform 60A shown in FIG. 1, a reduction of fluid consumption from about 220 microliters per sample to about 170 microliters per sample has been achieved.

Other Sample Processing Systems

In addition to the systems disclosed herein, the composite platforms discussed above can also be used with other sample processing systems, including systems designed for automated examination of tissue samples and/or biological fluids. Examples of systems that are compatible with the composite platforms above are disclosed, for example, in U.S. Patent Application Publication No. 2013/0203100, the entire contents of which are incorporated by reference herein.

System Alignment and Calibration

To achieve repeatable, high quality processing of samples, it can be important to maintain a high degree of alignment between the substrate 2 and platforms 60A and 60B. As discussed above, even relatively small misalignments can lead to fluid leakage from gap 92, and uneven sample processing (e.g., non-homogeneous sample staining). Referring to FIG. 1, substrate arms 10A and 10B rotate substrate 2 into position relative to platforms 60A and 60B. Accordingly, misalignment of substrate arms 10A and 10B leads to a volume mismatch between the amount of fluid dispensed into gap 92, and the volume of gap 92 between platforms 60A/60B and substrate 2, which differs from the expected value due to the misalignment of arms 10A/10B. When this occurs, the non-parallel relative orientation of substrate 2 and the surfaces of platforms 60A/60B can cause a non-symmetric fluid meniscus flow within gap 92 as fluid enters the gap, a thickness of gap 92 that is locally too large, and weaker meniscus stability at the edges of substrate 2, where the meniscus helps to promote fluid confinement within gap 92. These effects can lead to staining and other processing artifacts.

Figure 11:
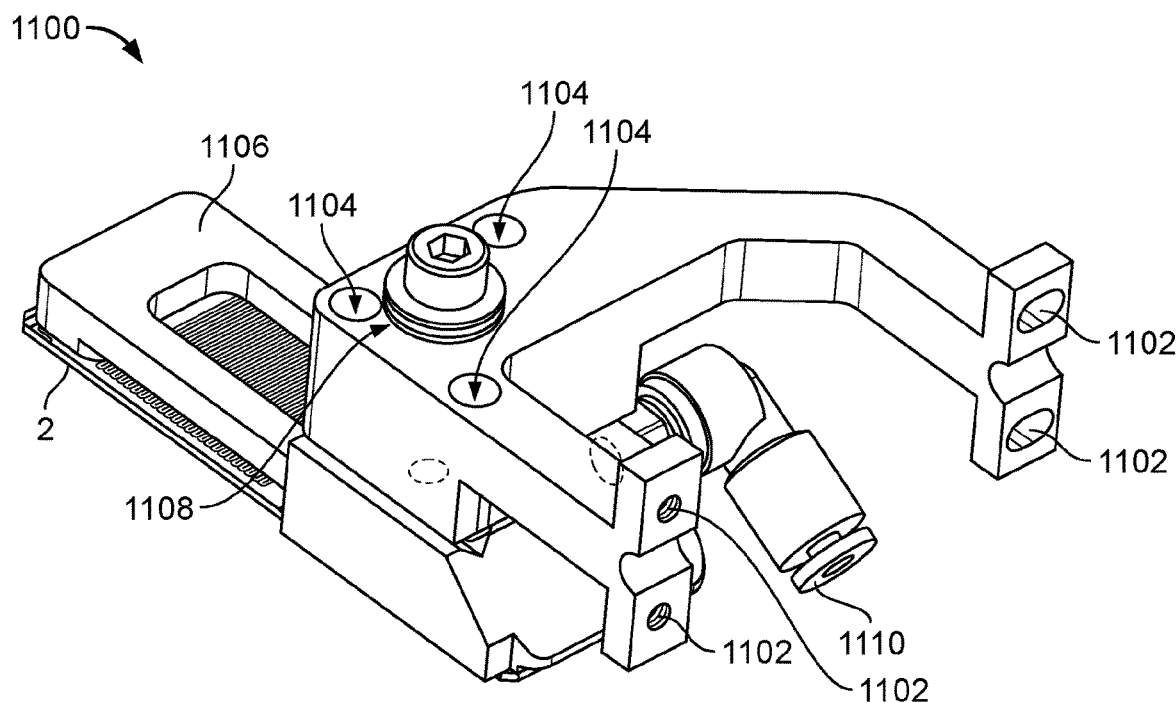
FIG. 11 is a schematic diagram of an arm for moving substrates between open and processing positions.

FIG. 11 shows a schematic isometric view of an arm 1100 that can be used as a substitute for substrate arms 10A and/or 10B in FIG. 1. Arm 1100 is connected to support 110A or 110B by fasteners that extend through mounting holes 1102. Substrate gripper 1106 is connected to arm 1100 by fastener 1108, and is configured to releasably pick up and release substrates 2. The three adjustment screws 1104 allow for tilt adjustment of substrate gripper 1106, effectively forming a kinematic mount for gripper 1106. By adjusting the three screws 1104, compensation for any tilt angle of substrate gripper 1106 relative to arm 1100 can be corrected, and substrate 2 can be positioned in a plane that is nominally parallel to the plane of platforms 60A and 60B (i.e., the plane defined by first surface 602). Vacuum port 1110 extends from substrate gripper 1106 and can be connected to a vacuum source so that, during operation, substrate 2 is attached to gripper 1106 by suction applied through one or more apertures in gripper 1106 (not shown).

Figure 19:
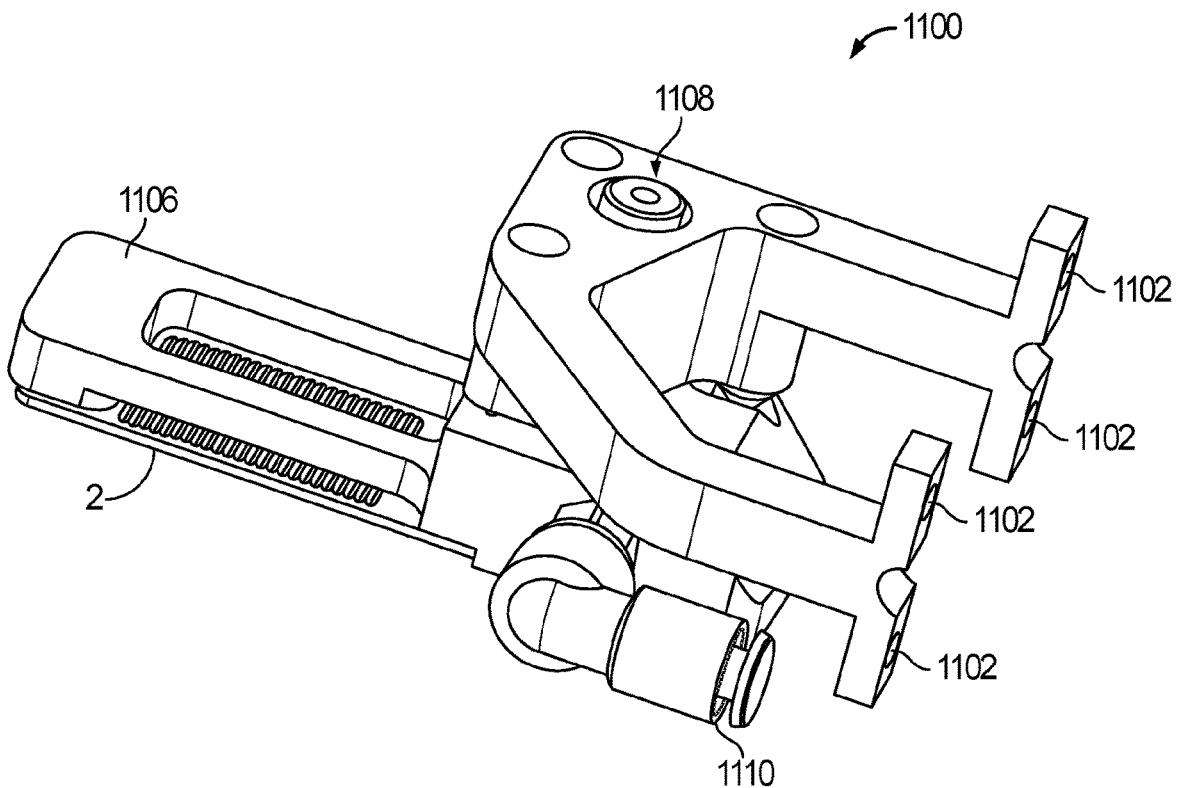
FIG. 19 is a schematic diagram of an arm for moving substrates between open and processing positions.
Figure 20:
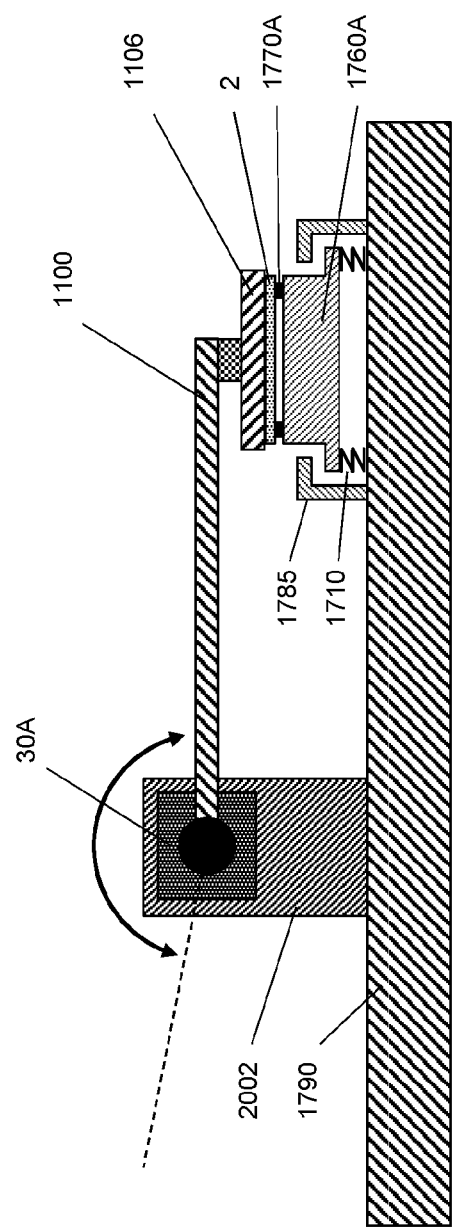
FIGS. 20-24 are schematic diagrams of fluid delivery platforms with deformable members.

In some embodiments, fastener 1108 can be positioned within a recess or groove formed in arm 1100, as shown in FIG. 19. In effect, fastener 1108 is countersunk partially or fully into arm 1100 via this implementation. It has been discovered experimentally that by seating fastener 1108 as shown in FIG. 19, the assembly formed by arm 1100 and substrate gripper 1106 can be made even more resistant to relative movement and to movement with respect to platforms 60A/60B, ensuring that the relative alignment between substrate 2 and platform 60A/60B is maintained during multiple processing cycles. This ensures reproducible staining over prolonged use of the system.

Figure 12:
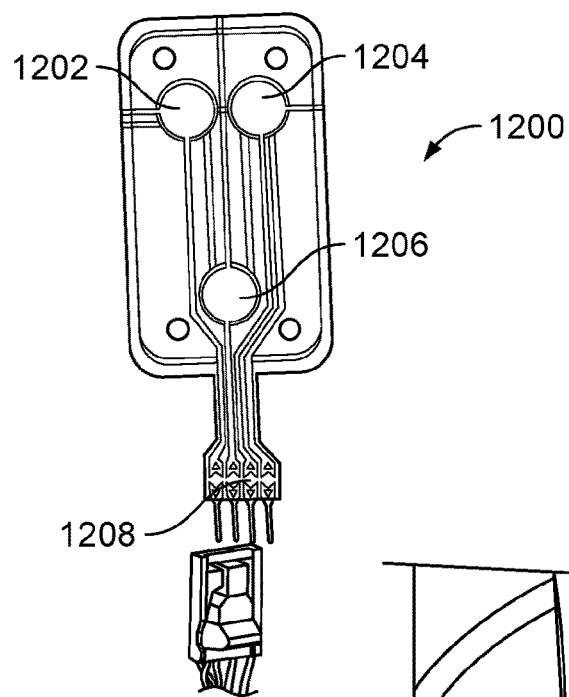
FIG. 12 is an image of a sensor pad.

To ensure proper alignment between substrate gripper 20A/B or 1106 and platform 60A/B, a sensor pad can be used. FIG. 12 shows an image of a sensor pad 1200 that includes three sensors 1202, 1204, and 1206. Each sensor is connected through a respective electrical communication line to interface 1208, which is configured for connection to a computer or other computing device. Through interface 1208, the computing device can receive electrical signals generated by sensors 1202, 1204, and 1206 for calibration of system 1.

Typically, sensor pad 1200 can be formed from a relatively thin, flexible layer of piezo-resistive ink sandwiched between two sheets of a polymer material (e.g., polyester). The thickness of sensor pad 1200 can be important, as it affects the reagent volume used by the calibrated system. As the thickness of sensor pad 1200 increases, the reagent volume consumed increases. Accordingly, it has been determined that a sensor thickness of between 200 microns and 270 microns effectively balances the use of an adequate volume of reagent to ensure proper sample processing, and at the same time avoids excessive reagent consumption by the system.

For purposes of alignment, sensors integrated into system 1 can also be used to measure and send electrical signals to a computer or other computing device. For example, sensors can be integrated into platforms 60A/60B to measure and transmit electrical signals for calibration. Alignment sensors can also be integrated into substrate grippers 20A and/or 20B, for example. To provide multiple alignment checks, multiple sensors can be integrated into system 1, and the system can perform multiple alignment procedures with respect to the sensors prior to sample processing. As a further alternative, in some embodiments, a calibration or measurement slide can be used to ensure alignment.

Figure 14:
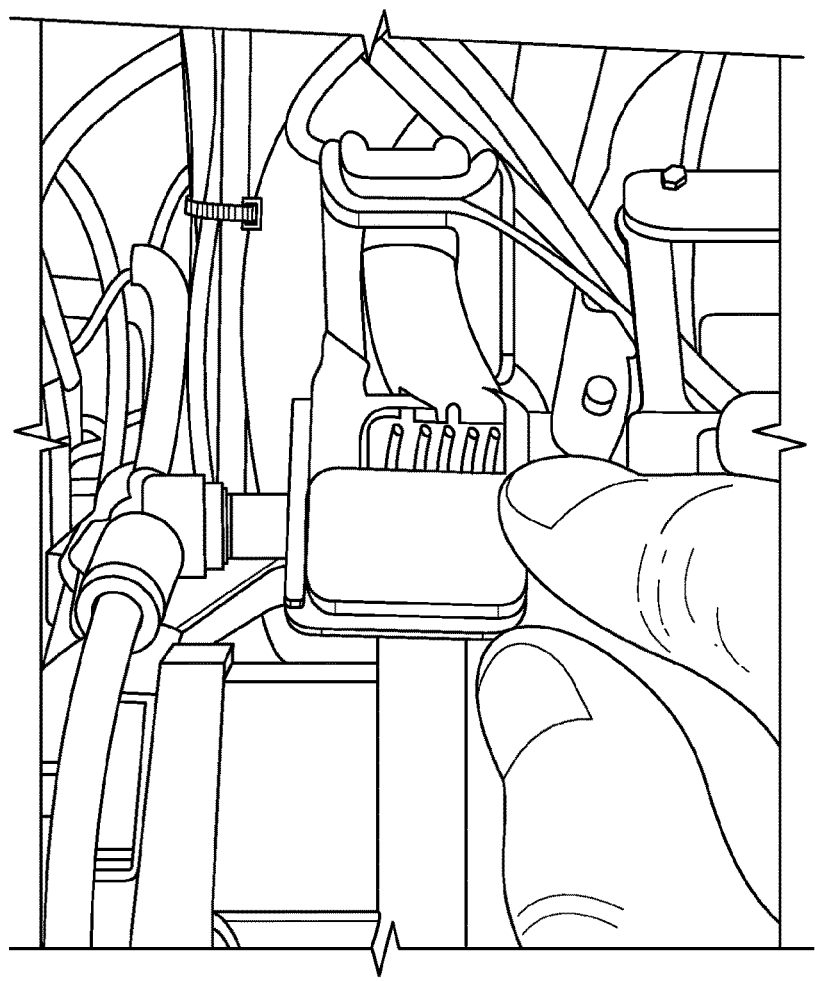
FIG. 14 is an image showing a substrate mounted on a substrate gripper in an open position.
Figure 13:
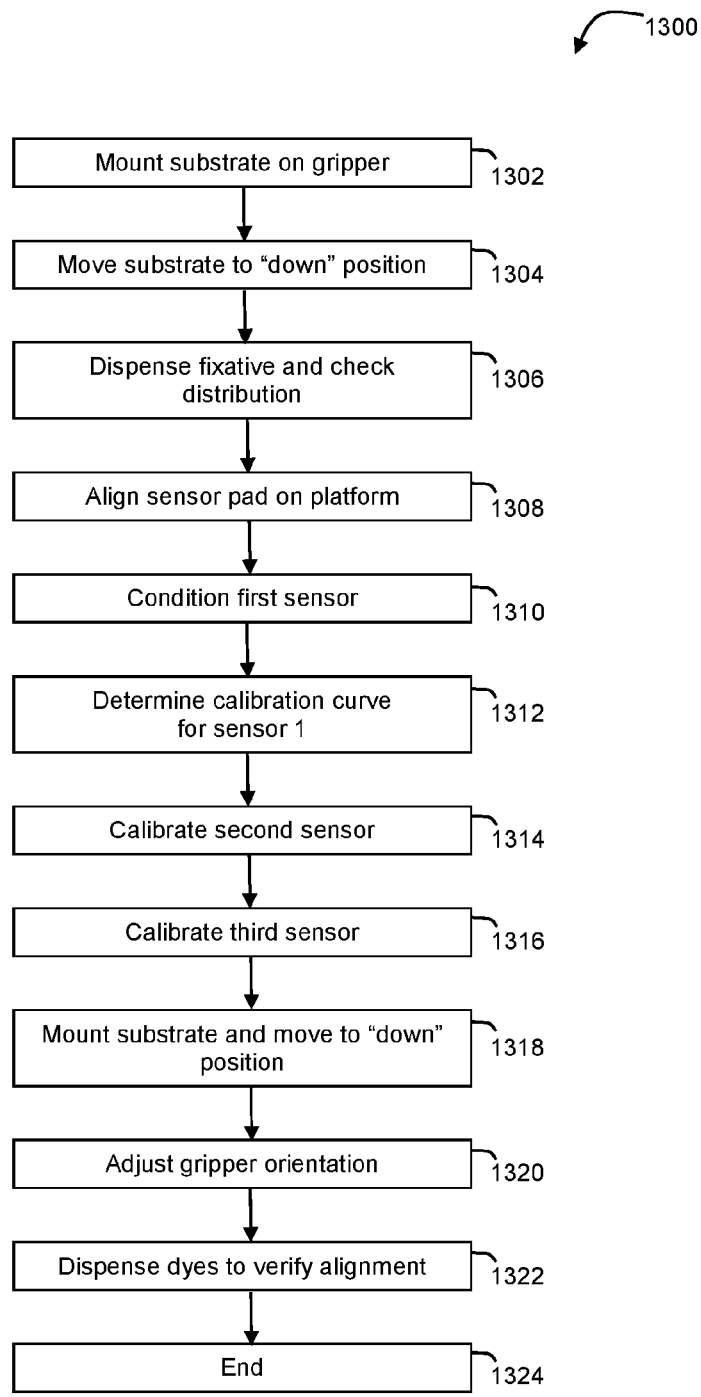
FIG. 13 a flow chart showing a series of example steps for aligning a substrate gripper to a fluid delivery platform.
Figure 15:
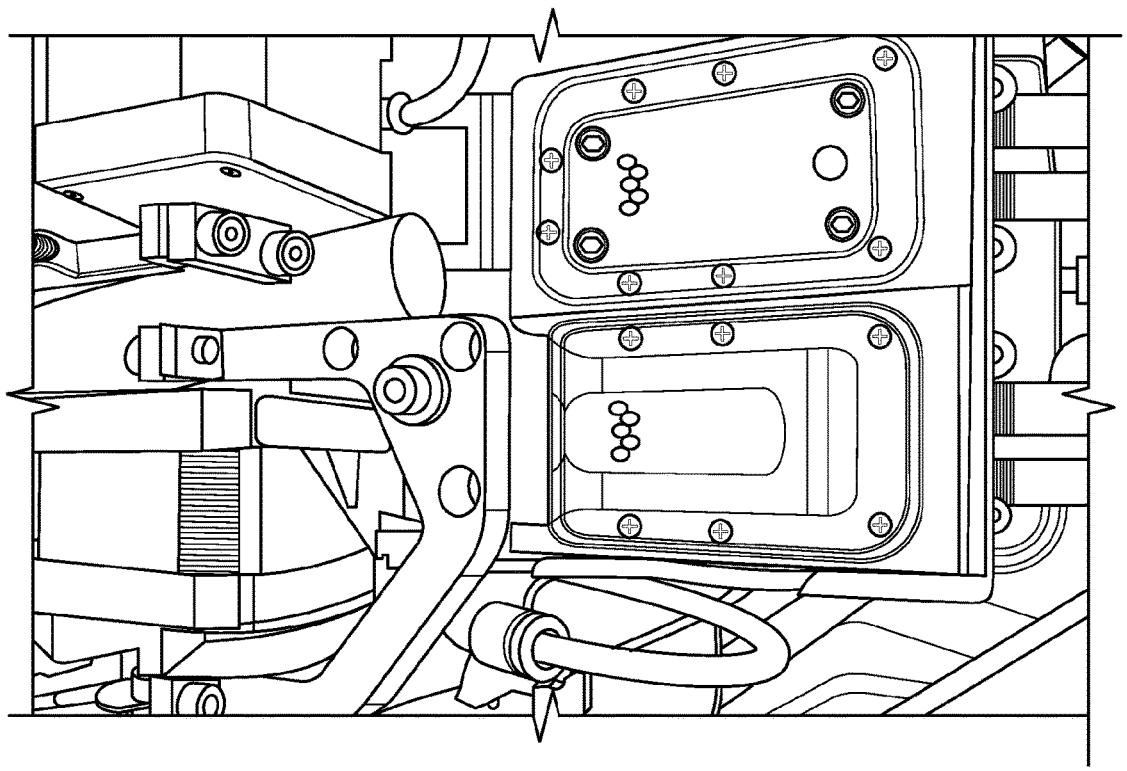
FIG. 15 is an image showing a substrate mounted on a substrate gripper in a processing position.

FIG. 13 is a flow chart 1300 that includes a series of steps for aligning a substrate gripper to platform 60A/B. After initializing system 1 and cleaning the platform surface to remove any stain residue, a substrate (e.g., a microscope slide) is first mounted on the substrate gripper in step 1302 by activating the system's vacuum source. This step is illustrated in the image shown in FIG. 14. Next, in step 1304, after ensuring that the gripper is in the "home" position, the gripper is rotated (e.g., by rotating arm 10A/B or arm 1100) to the "down" position, as shown in FIG. 15. Then in step 1306, 220 microliters of fixative are dispensed into gap 92, and the distribution of the fixative within the gap is checked to determine whether the fixative is homogeneously distributed. The gripper is then rotated back to the "up" position, the substrate is removed, and the platform is cleaned to remove any excess fixative.

Next, in step 1308, a new slide is mounted on the substrate gripper in the "home" position, the waste vacuum is activated on platform 60A/B, and sensor pad 1200 is positioned on the platform and aligned with the platform's offsets. Sensor pad 1200 is then connected to a computing device.

Figure 16:
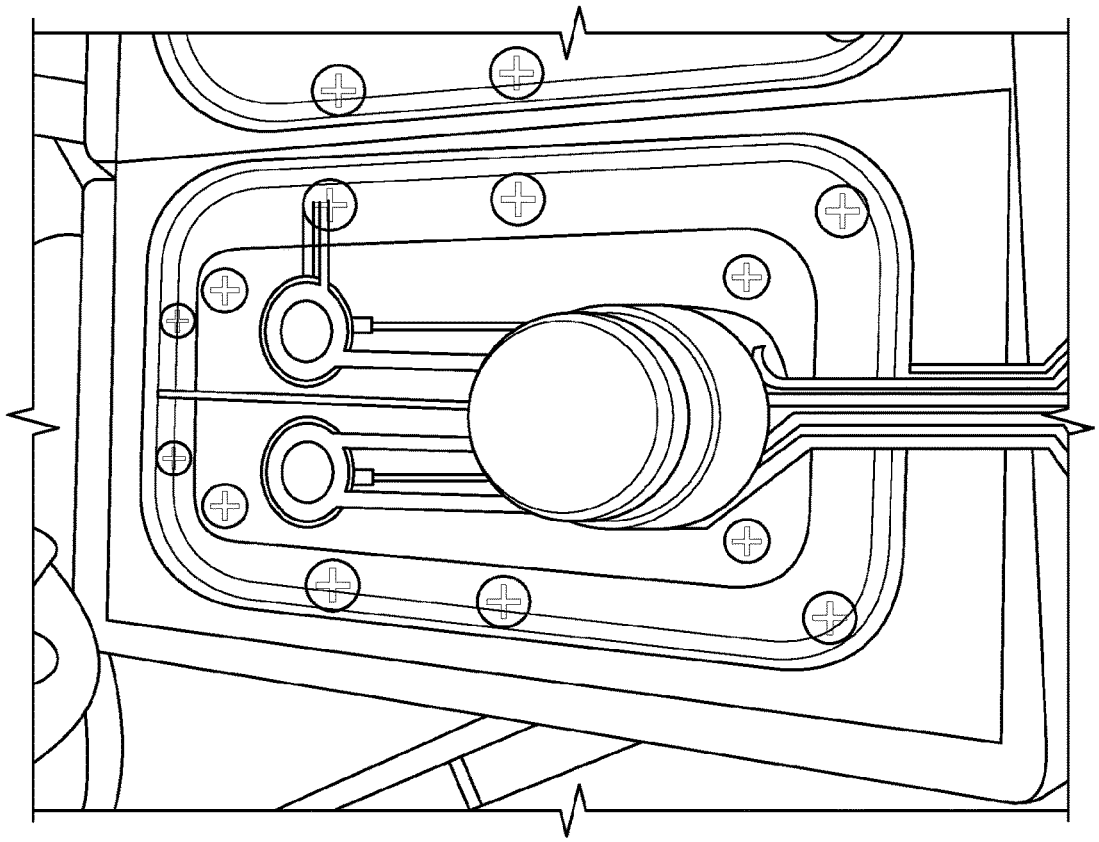
FIG. 16 is an image showing a calibration mass positioned on a sensor pad.

In step 1310, a first one of the three sensors on sensor pad 1200 is conditioned. After pressing gently on the first sensor to verify that the voltage response of the sensor drops (e.g., below 1 V) in response to the applied pressure, a 20 g mass is placed on the sensor, as shown in FIG. 16, and the voltage response is measured. This procedure is repeated with a 50 g mass, and with a combination of the 20 g and 50 g masses. Then, based on the measured voltage responses for the 20 g, 50 g, and 70 g applied masses, a calibration curve is determined for the first sensor in step 1312 by determining a line of best fit to the voltage measurements as a function of applied mass.

Next, in steps 1314 and 1316, the second and third sensors are calibrated in the same manner as the first sensor. Following step 1316, the voltage responses of all three sensors 1202, 1204, and 1206 are calibrated. Then, in step 1318, after mounting a slide on the substrate gripper in the "home" position, the gripper is rotated to the "down" position, with sensor pad 1200 still aligned on the platform, and the waste vacuum deactivated. In step 1320, with sensor pad 1200 secured between the slide and the platform, the orientation of the gripper is adjusted until all three sensor voltage responses are equal, within acceptable variances.

Finally, in step 1322, sensor pad 1200 is removed from the platform, the gripper (with the slide still mounted) is placed in the "down" position, and red and blue dyes are dispensed into gap 92 for visual verification of alignment. After verification, the procedure terminates at step 1324.

Fluid Dispensing Platforms

As discussed above, controlling the gap 92 between substrate 2 and platforms 60A/60B is an important aspect of the systems and methods disclosed herein, as it affects the reproducibility with which samples are processed. Nominally during sample processing, gap 92 is filled with a precisely metered volume of fluid, matched to the volume of the region bounded by the surfaces of substrate 2 and platform 60A/60B. It is important that air pockets no be present within gap 92, which can occur when the volume of gap 92 is larger than the amount of fluid dispensed into the gap. When air pockets are present, fluids such as stains flow through gap 92 non-uniformly and can be applied to samples unevenly. When the stained samples are subsequently analyzed, artifacts in sample images can arise from the non-uniform staining, and these artifacts can render quantitative measurements performed on the samples inaccurate.

It is also important that the volume of fluid dispensed into gap 92 not exceed the volume of gap 92. If the fluid volume exceeds the gap volume, fluid menisci at the edges of substrate 2 can rupture, leading to leakage of fluid out of gap 92. Fluid losses occur in this manner, and samples stained under such conditions can also yielding quantitative imaging artifacts that arise from non-uniform staining.

The shape of gap 92 can also affect fluid filling and draining performance. If the thickness of gap 92 changes along the direction of fluid flow within gap 92, then capillary forces in the fluid vary and the flow resistance changes nonlinearly. When flow resistance varies significantly within gap 92, stains and other fluids do not interact homogeneously with samples, which can lead to uneven staining performance.

Accordingly, precise control over the thickness of gap 92 is linked to control over the performance of the methods and systems disclosed herein. Typically, in the sample processing systems disclosed herein, because the thickness of gap 92 is between about 10 microns and about 800 microns, small differences in gap thickness can manifest as significant variations in performance.

The preceding discussion of FIG. 1 focused on embodiments of the systems in which a platform (e.g., platform 60B/50B) includes a series of offsets to ensure that substrate 2 does not contact the platform surfaces during sample processing. However, the fluid delivery platforms can also be implemented in other ways.

FIG. 17 is a schematic diagram of another staining platform 1760A. Extending upward from platform 1760A are four spacers 1770A-D. Deformable members 1710 extend between support block 1790 and staining platform 1760A. Guiding elements 1785 limit the extent of motion of platform 1760A.

During operation, when substrate 2 is rotated into a processing position, the substrate contact spacers 1770A-D. Thus, by adjusting the amount by which each of spacers 1770A-D extends beyond the surface of platform 1760A, the geometry and volume of gap 92 can be precisely controlled. In addition to establishing a parallel relationship between platform 1760A and substrate 2, spacers 1770A-D can be adjusted to define a gap 92 with a more complex but still reproducible shape such as a wedge.

Figure 18:
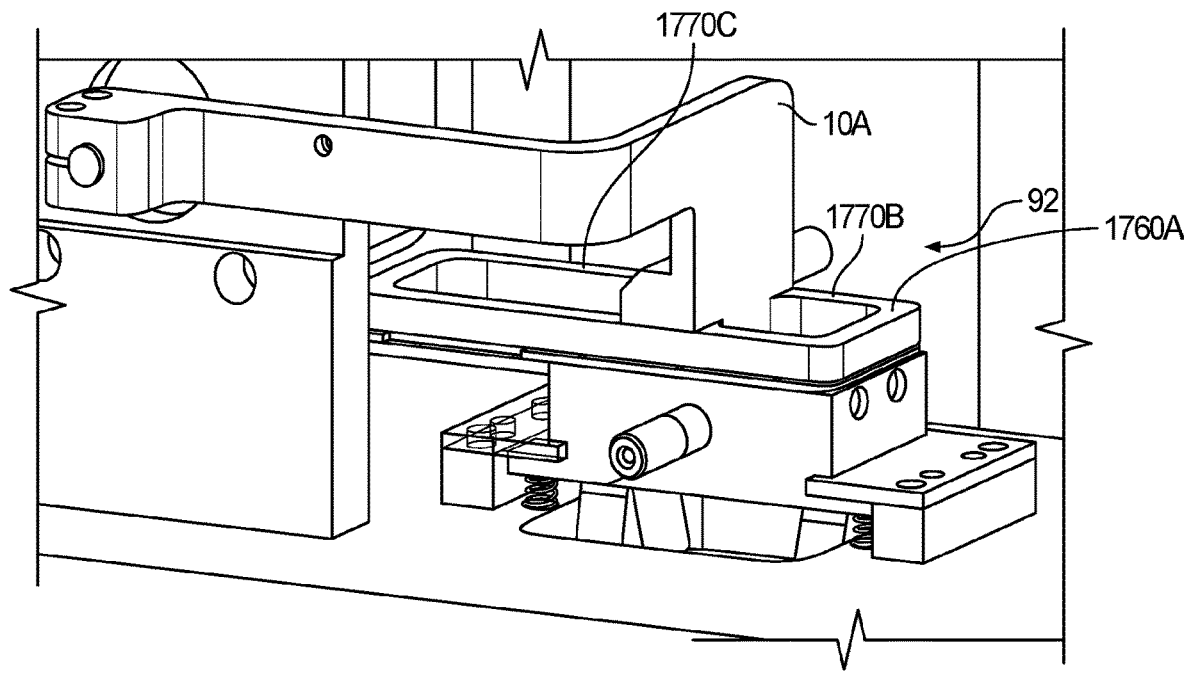

As substrate 2 is lowered into contact with spacers 1770A-D, as shown in FIG. 18, deformable members 1710 allow platform 1760A to move in a direction perpendicular to the plane of platform 1760A. Because deformable members 1710 apply a force that tends to press platform 1760A in the direction of the substrate, each of the spacers 1770A-D contacts substrate 2. As a result, a gap 92 of reproducible thickness is formed between platform 1760A and substrate 2, the thickness of the gap being defined by the geometry of spacers 1770A-D.

In this manner, complex calibration involving the motion of arms 10A/10B relative to platform 1760A can be eliminated, and the volume and shape of gap 92 can be defined only through adjustment of spacers 1770A-D, without adjusting for the thickness of substrate 2. The deformable nature of members 1710 ensures that substrate 2 and spacers 1770A-D are pressed together even when the substrate thickness varies and/or arms 10A/10B do not position substrate 2 at exactly the same processing position each time. A gap 92 of reproducible volume and shape is established even when such variations occur.

Relative to certain other implementations, platform 1760A is of lower complexity and cost, as it eliminates complex calibration steps involving the motion of substrate arms and complex positioning hardware associated with such calibrations. At the same time, platform 1760A allows robust and reproducible control over the geometry of gap 92, thereby ensuring that fluid is consistently applied to multiple samples. Moreover, by establishing a gap 92 of consistent geometry, the volumes of various processing fluids delivered into gap 92 can be maintained constant, reducing day-to-day variability in the system and its consumption of fluids.

Deformable members 1710 can generally be implemented in a variety of ways. In some embodiments, for example, deformable members 1710 can be springs or other coiled members. More generally, deformable members 1710 are elements that can be compressed along a direction orthogonal to the plane of platform 1760A, and which apply a force along that same direction to platform 1760A. Deformable members 1710 can also be implemented, for example, in the form of blade springs, disc springs, members formed of elastic materials such as soft polymers, rubbers, and polymer foams. Further, in some embodiments, deformable members 1710 can be implemented as hydraulic, pneumatic, magnetic, and/or electromagnetic suspensions. For example, a hydraulic fluid, a gas, or a field (e.g., a magnetic field) can be used to suspend platform 1760A above support block 1790, and to apply opposing force to platform 1760A when substrate 2 contacts spacers 1770A-D.

It should be noted that in addition to applying force to platform 1760A to ensure contact with spacers 1770A-D, deformable members 1710 also permit small rotations of platform 1760A relative to substrate 2 so that alignment can be achieved highly reproducibly. As such, requirements for highly precise alignment of certain components of the system relative to one another can be eliminated. That is, because deformable members 1710 allow for both rotational and translational alignment flexibility, alignment tolerances for the other components of the system can be relaxed.

In some embodiments, as discussed above in connection with FIGS. 17 and 18, platform 1760A is suspended relative to a support block using deformable members 1710. Alternatively, or in addition, in certain embodiments, platform 1760A can be mounted via a rigid or fixed connection to support block 1790, and substrate 2 is suspended above platform 1760A via one or more flexible/deformable members. Deformable members for mounting substrate 2 in this manner can be integrated into the system in various ways. For example, a seal formed from one or more flexible members can be positioned between substrate 2 and a substrate gripper (e.g., substrate grippers 20A/20B and 1106). As another example, one or more flexible members can be positioned between arm 10A/10B and substrate grippers 20A/20B/1106. As further examples, one or more flexible members can be used to mount actuators 30A/30B within the system, and arms 10A/10B can be formed from materials that are deformable.

FIGS. 20-27 are schematic diagrams that show additional embodiments of the system, with deformable members located at different positions within the system. In each of FIGS. 20-27, actuator 30A (e.g., a motor) is connected via mount 2002 to support block 1790. Actuator 30A rotates arm 1100, which is connected to substrate gripper 1106, between an open position and a processing position above platform 1760A. As discussed above spacers 1770A-D (only one of which is labeled in FIGS. 20-27 for clarity) define a gap between substrate 2 and platform 1760A.

Figure 21:
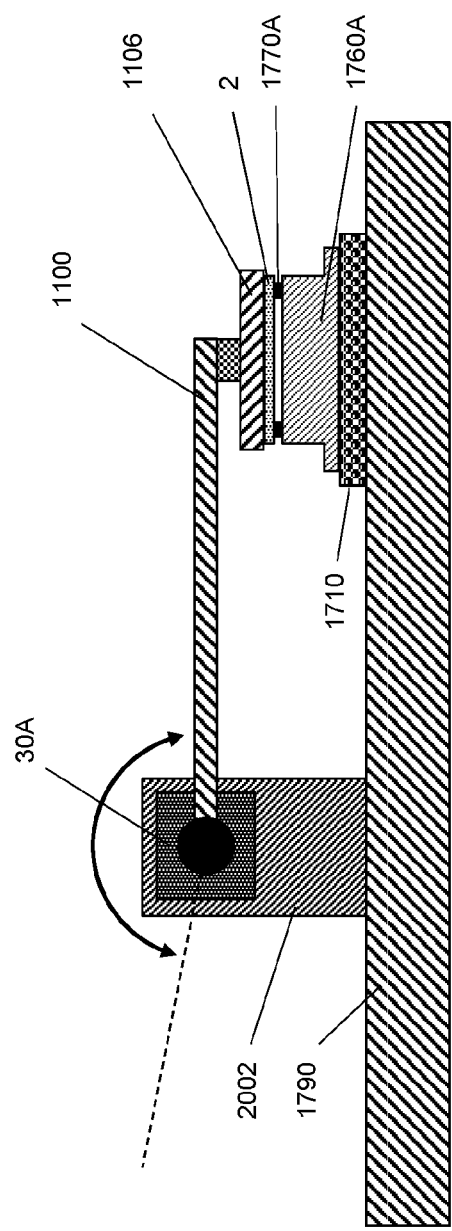

In FIGS. 20 and 25-27, deformable members 1710—implemented as a plurality of springs—suspend platform 1760A above support block 1790, as discussed above. In FIG. 21, deformable member 1710 is implemented as an elastic layer positioned between support block 1790 and platform 1760A, which allows platform 1760 to rotate and translate relative to support block 1790. Because deformable member 1710 is formed from an elastic material (e.g., foam, rubber), member 1710 in FIG. 21 presses platform 1760A and spacers 1770A-D against substrate 2 in the same manner as the springs in FIG. 20.

Figure 22:
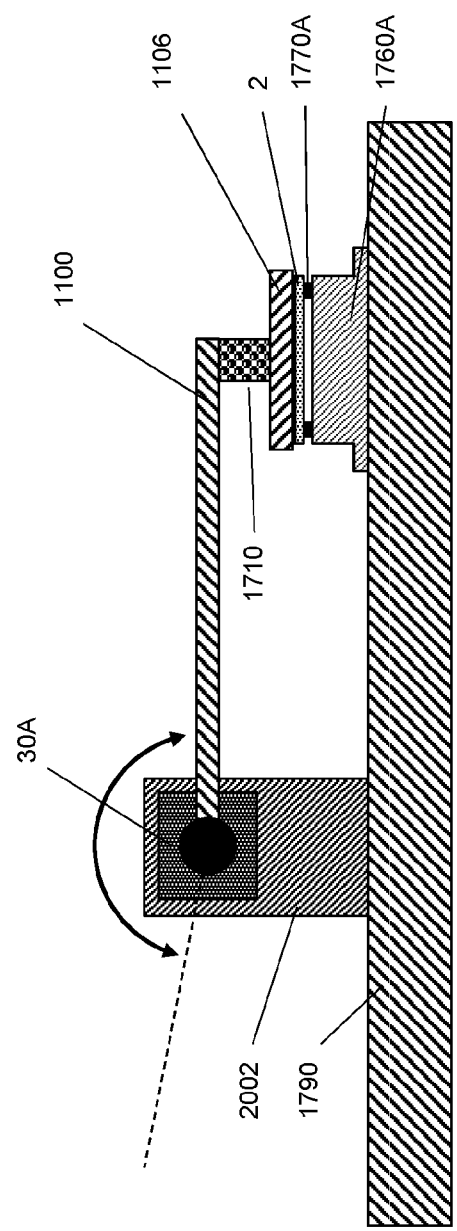
Figure 23:
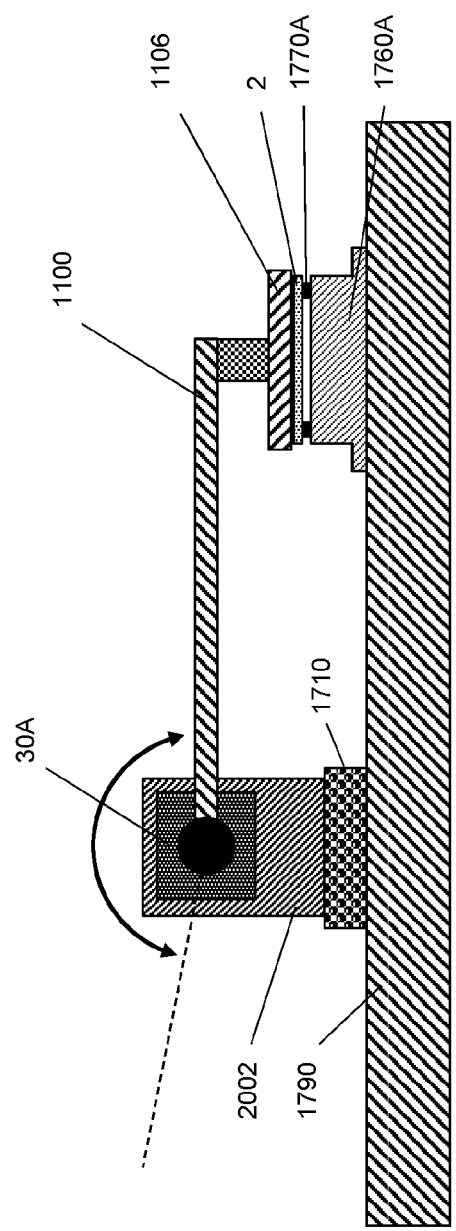
Figure 24:
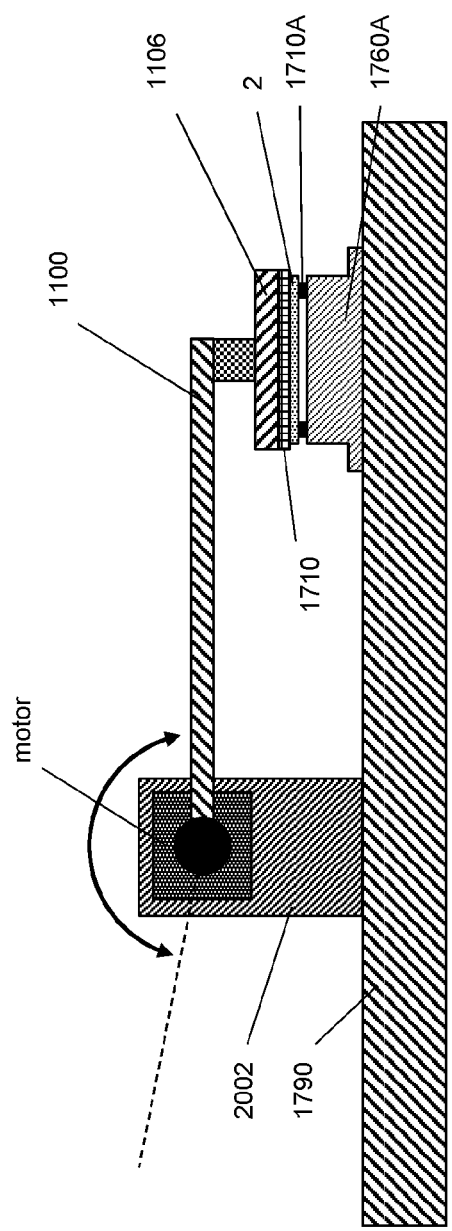

In FIG. 22, deformable member 1710 is positioned between arm 10A and substrate gripper 20A. Platform 1760A is rigidly mounted to support block 1790, and deformable member 1710 presses substrate 2 against spacers 1770A-D. In FIG. 23, deformable member 1710 is positioned between mount 2002 and support block 1790, and functions in a similar manner to press substrate 2 against spacers 1770A-D. In FIG. 24, deformable member 1710 is implemented as a flexible seal between substrate 2 and substrate gripper 20A, and functions in a similar manner to the deformable members shown in FIGS. 22 and 23.

As discussed above, the deformable member(s) ensure that the substrate is pressed against the platform such that all spacers 1770A-D contact the substrate surface. By using flexible, deformable elements, the movement of the arm and stopping position of the motor does not need to be controlled to such a high degree of precision as can otherwise be necessary when the substrate and platform are both rigidly mounted and positioned with respect to one another. As a result, for example, precise motor position control requirements can be relaxed, which allows a variety of different types of motors to be used. In addition to stepper motors, AC/DC brushed or brushless motors can be used. Furthermore, a variety of actuators can also be used, such as pneumatic actuators. Examples of mechanisms that can be used to ensure that actuator motion is halted with the substrate positioned correctly with respect to the platform include: mechanisms that function as a mechanical stopper to limit actuator-based rotation of arms 10A/10B; mechanisms in which actuator rotation is limited to a defined (e.g., programmed) number of steps (e.g., for a stepper motor), or limited by encoder or distance sensor-based measurements; mechanisms in which a switch or sensor is used to provide a feedback signal that halts actuator movement when the substrate has reached its proper alignment position (examples of such sensors include optical sensors, magnetic sensors, inductive sensors, capacitive sensors, electromagnetic sensors, distance sensors, and electrical contact-based switches); mechanisms that include one or more sensors that measure the clamping force applied by the actuator (e.g., based on a measurement of the motor current), and halt actuator motion when the applied force exceeds a threshold value, the threshold value having been determined to result in sufficient contact between the substrate and the platform; and mechanisms that include one or more switches and/or sensors to provide a feedback signal based on the deformation of various elements of the system, including for example relative motion between platform 1760A and support block 1790, relative motion of substrate grippers 20A/20B/1106 relative to arms 10A/10B, deformation of arms 10A/10B, and deformation of one or more deformable elements used to mount actuators 30A/30B to the system. Suitable signals indicating relative motion and/or deformation can be generated, for example, by electrical contact switches, optical sensors, magnetic sensors, electromagnetic sensors, inductive sensors, capacitive sensors, strain gauges, force sensors, and torque sensors, any one or more of which can be integrated into the system.

Figure 25:
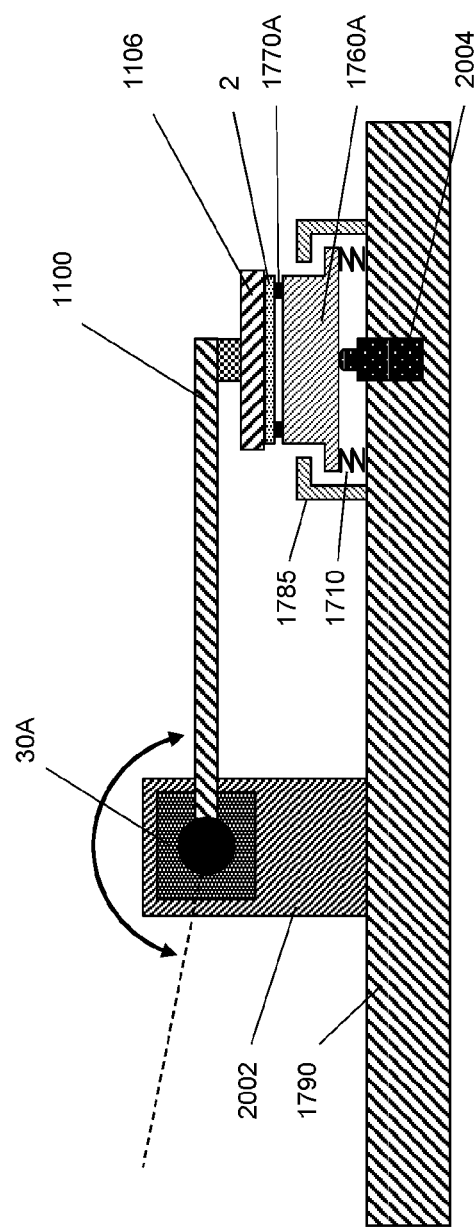
FIGS. 25-27 are schematic diagrams of fluid delivery platforms with sensors for detecting relative movement and/or deformation of components.
Figure 26:
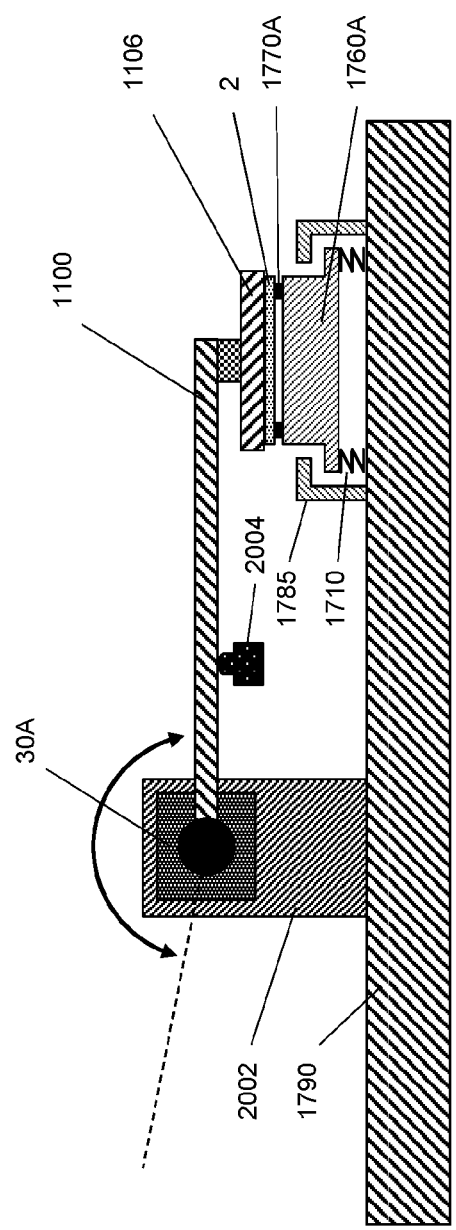
Figure 27:
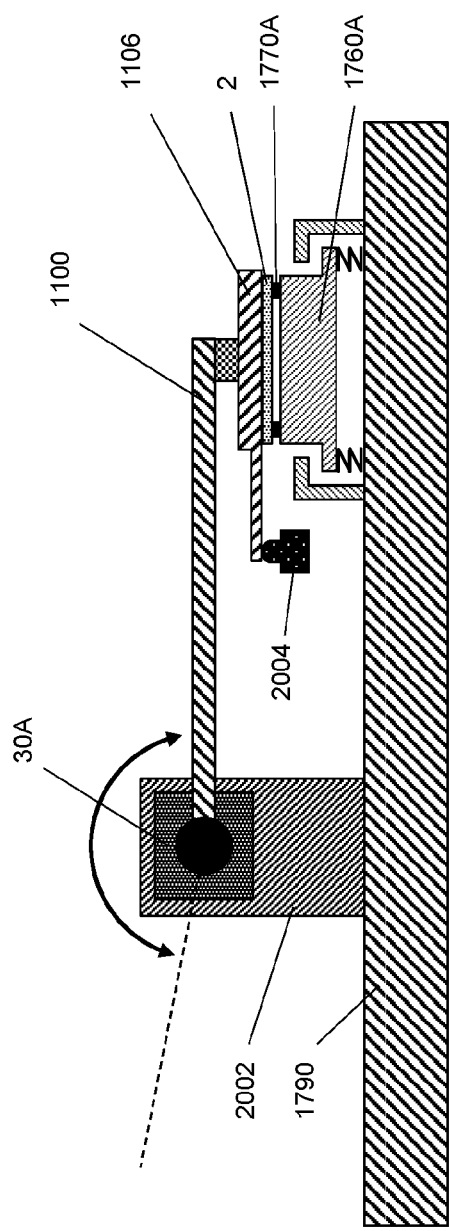

FIGS. 25-27 are schematic diagrams of systems that include one or more sensors for detecting relative movement/displacement of components of the system, and generate feedback signals that can be used to halt actuator motion. In FIG. 25, for example, a sensor 2004 detects the position of platform 1760A relative to support block 1790. Sensor 2004 can be a mechanical switch, an electrical contact switch, and any of a variety of sensors including (but not limited to) optical sensors, magnetic sensors, capacitive sensors, inductive sensors, and electromagnetic sensors.

Sensors can also be used to detect the relative position/displacement/deformation of components of the system other than platform 1760A. In FIG. 26, sensor 2004 is positioned to detect the relative position of arm 10A. In FIG. 27, sensor 2004 is positioned to detect the relative position of substrate gripper 20A. Sensors 2004 in FIGS. 26 and 27 can generally include any of the same sensors as in FIG. 25, and other sensors as well.

Platform 1760A in FIG. 17 includes four spacers 1770A-D. More generally, however, platform 1760A can include any number of spacers. For example, in some embodiments, platform 1760A has two spacers or three spacers. In certain embodiments, platform 1760A includes five or more spacers (e.g., six or more spacers, eight or more spacers, ten or more spacers, or even more spacers).

While spacers 1770A-D are implemented as "pins" in FIG. 17, more generally they can have any shape that provides a stable point of contact for substrate 2. For example, in some embodiments, the spacers can be implemented as ridges that extend along at least a portion of the sides of platform 1760A. In certain embodiments, the spacers can be implemented as L-shaped corner members. In some embodiments, the spacers can have circular, elliptical, square, rectangular, triangular, hexagonal, octagonal, or polygonal cross-sectional shapes.

In some embodiments, the spacers can be fabricated monolithically as part of the platform 1760A, e.g. by milling or injection molding. Alternatively, in certain embodiments, the spacers can be fabricated as separate element from platform 1760A, and mounted to platform 1760A by processes such as gluing or pressing.

In some embodiments, the spacers can be mounted onto platform 1760A in an adjustable manner such that the gap thickness and shape can be adjusted as desired. For example, spacers 1770A-D can be mounted to platform 1760A using a mechanism that controls the length of each spacer that protrudes above the surface of platform 1760A, e.g., using shims, pin-sets with different lengths, and/or platforms with different thicknesses/shapes.

Sample Processing Phases

Depending upon the nature of sample 3, a number of different processing phases can be performed as part of an overall processing sequence to prepare the sample for examination. Examples of such phases are discussed below. However, it should be appreciated that a wide variety of different processing phases and combinations of phases can be performed using the systems disclosed herein, including phases not specifically discussed as examples herein.

(i) Fixative Phases

Fluid tubes 52A-55A and 52B-55B can be positioned to deliver fixative to platforms 60A and 60B, gap 92, substrate 2, and sample 3 during sample processing. Fixatives that can be used include chemicals used for protecting biological samples from decay, and such fixatives can impede biochemical reactions occurring in the sample and increase the mechanical strength and stability of the sample. Various fixatives can be used including, but not limited to, methanol, ethanol, isopropanol, acetone, formaldehyde, glutaraldehyde, EDTA, surfactants, metal salts, metal ions, urea, and amino compounds.

Referring to FIG. 4, one or more fluid tubes 52-55A can be connected to a port inside platform 60A and a respective fixative reservoir 210A. The fluid tubes may also include a connection to a pump 200A and/or a valve capable of directing fixatives from the reservoir through the tube and a port located on the platform, and onto a substrate and sample. As an example, pump 200A can direct fixative from reservoir 210A through tube 54A, through block 80A, out from port 44A, onto platform 60A, into the gap 92 between the platform 60A and substrate 2, and onto substrate 2 containing sample 3. After applying a specific quantity of fixative to substrate 2, a vacuum or other suction source 220A and/or 221A can evacuate residual fixative from platform 60A, the gap 92, and substrate 2 into waste container 230A and/or 231A via one or more of ports 40A and/or 41A through waste tubes 50A and 51A.

In some embodiments, pump 200A directs a fixative such as methanol through tube 54A and port 44A, onto platform 60A and into the gap 92 at a flow rate of 70 microliters per second for a period of four seconds. A vacuum or other suction source 220A and/or 221A then removes residual fixative present in gap 92 and/or on the platform 60A and substrate 2 using ports 40A and/or 41A and waste tubes 50A and/or MA (further described below). Next, the pump 200A can again direct fixative through tube 54A and port 44A, and onto platform 60A at a flow rate of 70 microliters per second for a period of four seconds, followed by a second fluid evacuation process. This process of fixing and evacuating can be repeated again, using the same or a different fixative, depending on the type of biological sample requiring fixation.

Further, system 1 is capable of varying the frequency and flow rates for each fixing phase. Other flow rates sufficient to overcome any surface tension in the fluid located in gap 92 and fix sample 3 for further processing and evaluation can also be used. By adjusting the frequency and/or flow rate of the fixing phases, system 1 can achieve optimal fixation for various samples using several different fixatives. In some embodiments, the flow rate of fluid into gap 92 is not constant during the filling cycle. For example, fluid can be dispensed into gap 92 at a slower rate initially, and then the rate of fluid flow into gap 92 can be gradually increased. In certain embodiments, during a single filling cycle, fluid can be dispensed into gap 92 at a rate that decreases over time. In some embodiments, filling can occur at a slower rate initially, at an increasing rate after an initial portion of gap 92 is filled, and then at a slower rate as the filling of gap 92 nears completion. By filling gap 92 slowly at the beginning and end of the filling cycle, the risk of fluid leakage due to a broken fluid meniscus within gap 92 can be reduced.

It should be noted that while the foregoing discussion of filling frequency and flow rates occurs in the context of fixing phases, the same techniques can also be applied to filling gap 92 with other solutions, including staining solutions and rinsing solutions.

Machine instructions for different types of samples, fluids, and processing methodologies can be hardwired or preprogrammed in control unit 5 and selected by a system operator as needed.

In general, a wide variety of fixatives can be applied to samples during fixative phases. For example, 85% methanol can be used as the fixative. For some stains, an ethyl alcohol or formaldehyde based fixative can be used.

(ii) Staining Phases

System 1 also includes tubes and ports configured to apply one or more dyes or stains to a sample fixed to a substrate in one or more staining phases. Staining a sample increases the contrast of the sample when it is viewed or imaged under a microscope or other imaging device. Romanowsky stains and/or other dyes or stains can be used, including hematoxylin and eosin, fluorescein, thiazin stains using antibodies, nucleic acid probes, and/or metal salts and ions.

In certain embodiments, pump 201A directs dye or stain from reservoir 211A into stain tube 52A. The stain is then directed into port 42A attached to block 80A. Next, the stain flows out of port 42A in platform 60A, into gap 92 between substrate 2 and platform 60A, and stains sample 3 on substrate 2.

In some embodiments, multiple tubes and ports can be used to apply stain to sample 3. For example, a second pump (e.g., pump 202A) can direct stain (e.g., the same stain or a different stain from that dispensed from reservoir 211A) from reservoir 212A through tube 53A and port 43A and onto platform 60A. In certain embodiments, two or more fluid tubes may connect to a shared stain reservoir or pump and/or valve used to direct stain through the ports and onto the platform. Referring back to FIG. 2, tube 52A may deliver red stain, such as a fluorescein dye, to the platform, substrate 2, and sample 3. Tube 53A may deliver blue stain, such as a thiazin dye. In FIGS. 1-6, the numbers, locations, and sizes of the ports on platform 60A are selected to optimize the application of stain to a sample fixed to the substrate. If other stains are selected, a different number, locations, and sizes of ports may be typical depending on the viscosity of the stain.

Each of ports 40A-45A (and 40B-45B) can include both an input channel for receiving fluid and an output channel for outputting fluid. In some embodiments, the output channels of the rinse 45A, fixative 44A, and staining ports 42A-43A are on the upper surface of platform 60A, and the input channels of vacuum ports 40A and 41A may be on opposite ends of the upper surface of platform 60A. The input channels of the rinse 45A, fixative 44A, and staining ports 42A-43A may be situated on the same lateral side of block 80A, and the output channels of the vacuum ports 40A and 41A can be positioned on opposite lateral sides of block 80A.

By way of example and with reference to FIG. 2, control system 5 instructs a pump (e.g., pump 201A) to direct a stain (e.g., a stain comprising fluorescein dye) from a stain reservoir into fluid tube 52A. The stain enters port 42A from the fluid tube. Then, the stain leaves port 42A at a flow rate of 140 microliters per second and is deposited into gap 92 between platform 60A and substrate 2 containing sample 3, so that the sample 3 is stained for a five second period. Following staining, a vacuum or other suction source (e.g., pumps 220 and/or 221) may then evacuate residual stain present in gap 92, on platform 60A, and on substrate 2 using ports 40A-41A and waste tubes 50A-51A.

System 1 can be programmed to repeat these staining and evacuation phases after a delay (e.g., a delay of between 3 seconds and 10 seconds, such as a five second delay), following the first staining phase. A second pump 202A can be instructed by control system 5 to direct thiazin dye from a stain reservoir through fluid tube 53A, out port 43A at a flow rate of 140 microliters per second, and onto platform 60A where it contacts the sample for a period of time, e.g., three seconds. A vacuum or other suction source (e.g., pump 220A and/or 221) may then evacuate residual thiazin dye present in gap 92 and/or on platform 60A and/or on substrate 2 using ports 40A-41A and waste tubes 50A-51A. As with the fixing phases, system 1 is capable of varying the frequency, delay times, and flow rates for each staining phase. The flow rate may range, e.g., from 70 to 140 microliters per second, or may be smaller or greater than the outer limits of this range (e.g., 10 to 500 microliters per second) provided the flow rate is sufficiently high to overcome surface tension present in the fluid located in gap 92 and desirably stain the sample for the intended evaluation, but also sufficiently low so that complete filling of gap 92 occurs without air inclusions and without rupturing the menisci that form along the edges of substrate 2 and that help to retain the fluid within gap 92.

Exemplary stains that can be applied to samples include, but are not limited to: Wright-Giemsa stain, Giemsa stains, and Romanowsky stains. Other agents such immunocytochemical reagents or other markers of specific cell components can also be applied to samples.

(iii) Waste Fluid Removal

As referenced above, a vacuum or other suction source 220 and/or 221 (e.g., such as a vacuumized canister or pump) can evacuate residual fluid from substrate 2, gap 92, and platform 60A during or between fixing and staining phases. Referring to FIG. 1, one or more waste tubes can be connected to sides 82A and 84A of block 80A. Waste or vacuum tubes 50A and 51A are used to withdraw fluid and small particulate matter from platform 60A, gap 92, and substrate 2 into a waste container or other location separate from system 1. With reference to FIG. 2, waste tubes 51A and 51B may be connected to separate vacuum sources 220 and 221, and waste containers 230 and 231, at the distal ends of the waste tubes. Alternatively, two or more waste tubes can be connected to a single vacuum source, and the same waste container, as shown in FIG. 4. Waste tubes 50A and 50B may extend through valves 90A and 90B, respectively, as shown in FIG. 3.

A vacuum or other source (e.g., vacuum pump 220 and/or 221) for applying suction may be connected to one or more of waste tubes 50A, 50B, 51A, and 51B to draw fluid from the platforms 60A and/or 60B, gap 92, and substrate 2 into waste containers 230 and 231. The vacuum force applied within the waste tubes may be equivalent to negative one to negative ten pounds per square inch ("psi") to provide sufficient suction for removing fluids when the gap 92 between the substrate 2 and the platform is between 100 to 200 microns. In general, as used herein, "negative" pressure refers to a pressure less than the ambient pressure within system 1 or the environment surrounding system 1. For example, in some embodiments, the environment surrounding system 1 has an ambient air pressure of approximately one atmosphere. "Negative" pressures refer to pressures that are less than this ambient air pressure (e.g., a pressure of negative one psi applied to a fluid is a pressure of one psi less than the ambient air pressure exerted on the fluid). Other vacuums ranging from negative 0.1 psi to negative 14 psi (e.g., negative six psi), or greater, can be used provided such vacuums are sufficient to overcome any surface tension in the fluid present in the gap 92 and remove all residual fluid in the gap 92 and on the substrate 2 and sample 3. In addition, immediately prior to applying vacuum to evacuate fluids from the gap 92, actuator 30A can raise the proximate edge of substrate 2 a distance of 15-35 microns from the sample processing position. This time-varying separation increased separation between substrate 2 and platform 60A can improve evacuation of any residual fluids in gap 92 during a vacuum phase, because small fluid droplets that remain within gap 92 tend to merge during this process to form larger fluid droplets which are then easier to evacuate from gap 92.

In some embodiments, control system 5 is configured to vary the frequency and vacuum applied for fluid removal during sample processing. Following a fixing phase, for example, control system 5 can open valves 90A and/or 90C and apply a vacuum of negative 5 psi in the waste tubes (e.g., waste tubes 50A and 51A) for a five second period. During this period, fixative is removed from the gap 92, substrate 2, and platform 60A through ports 40A and 41A. The fluid travels through the waste tubes, and is deposited in into one or more waste containers (e.g., containers 230 and/or 231). Once the evacuation period expires, control system 5 can instruct one or more of the valves 90A, 90C to close off the waste tubes 50A and/or 51A, thereby preventing further evacuation by the vacuum 220, 221. Control system 5 may direct system 1 to repeat this fluid removal step after each fixing phase.

Pinch values 90A, 90B, 90C, and 90D close off waste tubes 50A, 50B, 51A, and 51B, as shown in FIG. 1. The valves 90A-90D may be mechanically, electrically, hydraulically, or pneumatically actuated through actuators contained within or external to the valves. Valves 90A-90D operate to prohibit fluid flow through waste tubes 50A, 50B,

51A, and 51B. For example, when changing or emptying a full waste container 230 from system 1, it may be desirable to close the valves (90A-90D) to prevent leakage of residual fluids present in the waste tubes. Different valve types or other mechanisms such as clamps or stoppers may be used with embodiments of system 1 to close the waste tubes 50A, 50B, 51A, and 51B.

(iv) Rinsing Phases

Rinse solutions can be applied during sample processing with system 1 in one or more rinse phases. For example, it may be desirable to remove residual and/or excess fluids from sample 3 on substrate 2, gap 92, and platforms 60A and/or 60B between fixing phases, between staining phases, and/or between fixing and staining phases. Rinse solutions compatible with the present systems and methods include distilled water; buffered, aqueous solutions; organic solvents; and mixtures of aqueous and organic solvents, with or without buffering.

To rinse a sample, a pump (e.g., pump 203A) directs rinse solution (e.g., comprising distilled water) from a reservoir (e.g., reservoir 213A) into a rinse tube (e.g., rinse tube 55A). The rinse solution enters port 45A connected to block 80A. The rinse solution flows onto platform 60A through the output channel of port 45A, and then enters gap 92 between substrate 2 and platform 60A. Then, a vacuum source 220, 221 applies suction to one or more of waste tubes 50A and 51A to remove rinse solution from gap 92 and substrate 2; the rinse solution is transported to waste container 230 and/or 231.

In some embodiments, control system 5 may direct pump 203A to apply the rinse solution at a flow rate of, e.g., 70 microliters per second. Once introduced into gap 92, the rinse phase contacts sample 3 on substrate 2 for a period of, e.g., five seconds. As with fixing phases, control system 5 may vary the duration and flow rate of each rinse phase and the number of rinse phases. In addition, control system 5 may adjust the placement of one or more rinse phases during sample processing. Control system 5 may, for example, direct that a rinse phase occur once, after completion of all fixing phases, and that a second rinse phase occur once, after completion of all staining phases. Alternatively, rinse phases may be interspersed between two or more fixing phases or between two or more staining phases.

(v) Agitation Phases

Sample processing in certain embodiments may optionally include one or more agitation phases to disperse fixative, stain, and/or rinse fluids throughout gap 92, substrate 2 containing sample 3, and platforms 60A and/or 60B during the fixing, staining, and/or rinsing phases. Actuator 30A and/or 30B, shown in FIG. 3, can provide fine movement adjustment for changing the position of substrate 2 relative to platform 60A and/or 60B. Agitation is not required for any of the fluids that are used to process sample 3. However, in some embodiments, agitation can be used to mix/homogenize fluid within gap 92 when the gap is filled, and in evacuating fluid from gap 92 following specific processing phases.

Control system 5 can include software and/or hardware for instructing the actuator 30A and/or 30B to initiate an agitation phase. Actuator 30A and/or 30B can be configured to move substrate arm 10A and/or 10B up and down upon an agitation initiation command from the control system 5. The agitation phase may repeat for a predetermined number of agitation cycles. The term "agitation cycle," as used herein, refers to motion from a starting position in an upward direction, followed by movement in a downward direction opposite to the upward direction. In some embodiments, one or more agitation cycles return substrate 2 to the starting position at the conclusion of each cycle, or at least at the conclusion of some cycles. In certain embodiments, substrate 2 does not return to the starting position at the conclusion of some or all of the agitation cycles, but each cycle still includes an upward motion followed by a downward motion. Actuator 30A and/or 30B typically continues moving substrate 2 in one or more agitation cycles until a stop command is sent to the actuator from the control system 5. An agitation phase may temporarily increase the separation size (separation distance) between substrate 2 and the surface of platform 60A and/or 60B, and then return the substrate 2 to the sample processing position. In addition, an agitation phase may include a series of movements that shift substrate 2 between an angular position relative to the surface of platform 60A and/or 60B and the sample processing position. Surface tension in the fluids dispensed into the gap 92 between the platform 60A and/or 60B and substrate 2 causes a redistribution of the fluid on the substrate 2 when the substrate 2 moves from the sample processing position during the agitation phase and can advantageously improve fluid homogeneity across the sample 3.

It should be noted that in all of the techniques for agitation disclosed herein, the relative displacement between substrate 2 and platforms 60A/60B is controlled to ensure the fluid remains in gap 92. To ensure that the fluid remains in the gap, agitation occurs without rupturing the fluid menisci that form at the edges of substrate 2, as it is the menisci that are largely responsible for fluid confinement.

Other methods can also be used to move substrate 2 relative to the platforms 60A, 60B during agitation phases. For example, in some embodiments, the positions of one or more of offsets 70A-D and/or 71A-D (e.g., the amount by which the offsets extend above the surfaces of platforms 60A and/or 60B) can be rapidly adjusted to agitate sample 3. In certain embodiments, the positions of platforms 60A and/or 60B can be adjusted to cause agitation of sample 3. For example, platforms 60A and/or 60B can be moved alternately up and down (e.g., corresponding to the direction of movement of substrate 2 described above) to cause agitation of sample 3.

In some embodiments, agitation of sample 3 can be effected by varying the extent to which actuator 30A and/or 30B drives substrate 2 towards offsets 70A-D and/or 71A-D when the substrate arms 10A, 10B are made of a material that flexes, as discussed below. Strain gauges can be used to measure and adjust the frequency of the agitation applied to substrate 2 by detecting the variation in strain in the substrate arms 10A, 10B as a function of time. When sample 3 is agitated in this manner, substrate 2 typically only contacts one or two of offsets 70A-70D (or offsets 71A-71D).

The agitation phase can include one or more agitation cycles applied through actuator 30A and/or 30B. Further, agitation phases can occur once or multiple times during each of the fixative, stain, and/or rinse phases and in varying frequencies between each of the fixing, staining, and/or rinsing phases. For example, and referring to FIG. 3, actuator 30A and/or 30B may raise the proximate edge of substrate 2 vertically a distance of 35 microns from the sample processing position and subsequently return substrate 2 to the sample processing position three times, once after each fixing, staining, and rinse phase. Actuator 30A and/or 30B may complete each agitation cycle in two seconds (e.g., one second to raise the proximate edge of substrate 2 vertically a distance of 35 microns from the sample processing position and one second to return the substrate to the sample processing position). System 1 is capable of carrying out instructions to vary the agitation frequency and distance for each agitation cycle and/or phase. For example, an agitation phase may include actuator 30A and/or 30B raising the proximate edge of substrate 2 vertically a distance of 5 microns from the sample processing position and then returning the substrate to the sample processing position, 10 to 20 times per second.

Alternative combinations of agitation distances and frequencies can also be used. For example, in some embodiments, the agitation distance is 5 microns or more (e.g., 15 microns or more, 25 microns or more, 50 microns or more, 100 microns or more, 150 microns or more, 200 microns or more, 250 microns or more, 300 microns or more, 500 microns or more, 700 microns or more, 1 mm or more. For example, in certain embodiments, the agitation distance is between 35 microns and 350 microns.

In some embodiments, the agitation cycle frequency is one cycle per second or more (e.g., two cycles per second or more, three cycles per second or more, four cycles per second or more, five cycles per second or more, seven cycles per second or more, ten cycles per second or more).

Additional agitation techniques can also be used. For example, in some embodiments, substrate gripper 20A and/or 20B may include an actuator that rotates the substrate 2 about an axis perpendicular to the rotational axis of actuator 30A and/or 30B depicted in FIGS. 1 and 3.

Alternatively, platform 60A and/or 60B may be equipped with an offset adjuster for raising or lowering the one or more offsets 70A-D and/or 71A-D during fixing, staining, and rinsing phases. To implement the offset adjuster, platform 60A and/or 60B can include offsets that are attached to an internal plate in the platform. The height of the plate may be varied using an internal actuator, thus varying the height of the offsets. Alternatively, the position of the offsets 70A-D and/or 71A-D relative to substrate 2 can be changed by instructing the actuator to move platform 60A and/or 60B, or block 80A and/or 80B, thereby changing the separation distance during the agitation phase. Control system 5 can adjust the frequency of fluid cycles, flow rate, offset height, separation distance, and agitation parameters and frequency to process samples more efficiently, using significantly less fluid volumes during the sample preparation process as compared to conventional staining and preparing techniques.

In some embodiments, substrate arms 10A and/or 10B may be made of a material that flexes such that if a substrate 2 in the sample processing position rests against only two offsets extending from the platform, an actuator or other motive force element may rotate the substrate 2, e.g., slide, further towards the platform surface until the slide rests against all four offsets 70A-D and/or 71A-D. Varying the position of the substrate between these two positions may accomplish sufficient agitation during sample processing. Substrate arms 10A and/or 10B may include strain gauges to monitor the strain in the substrate arm 10A and/or 10B, and may be used to inform control system 5 of the position of the substrate 2 relative to the platform offsets 70A-D and/or 71A-D. In addition, the control system 5 may include information corresponding to the thickness imperfections of the substrate 2, which the control system 5 may account for when placing the substrate 2 in the sample processing position or during agitation phases.

(vi) Drying Phases

In certain embodiments, the control system 5 can dry the sample 3 using a dryer 4 attached to system 1. For example, dryer 4 can direct a flow of air across the sample 3. In general, system 1 can be controlled to vary the temperature of the air, the flow rate, the duration of the applied air flow, and the phase(s) during sample processing for drying the sample 3. For example, after completing a staining phase, dryer 4 can direct a flow of air at approximately 120° F. at a rate of 10 liters per minute for a period of 7 seconds across the sample 3. Other air temperatures (e.g., ambient temperature up to 300° F.), air flow rates (e.g., one liter per minute to 100 liters per minute), and air flow periods (e.g., from a few seconds to several minutes) can also be used.

OTHER EMBODIMENTS

A number of embodiments have been described. Nevertheless, it will be understood that various modifications may be made without departing from the spirit and scope of the disclosure. Accordingly, other embodiments are within the scope of the following claims.

What is claimed is:

1. An apparatus for preparing a sample on a substrate, comprising:
    a substrate handler configured to move a substrate between a first position and a second position; and
    a platform positioned so that when the substrate is in the second position, the platform faces the substrate,
    wherein the platform comprises:
        a fluid delivery area having a second surface formed from a hydrophilic material for which a water contact angle is 40 degrees or less; and
        a first surface facing the substrate when the substrate is in the second position, formed from a hydrophobic material for which a water contact angle is 100 degrees or more.

2. The apparatus of claim 1, wherein the platform comprises a first member formed of the hydrophilic material, and a layer of the hydrophobic material disposed on at least a portion of the first member to form the first surface.

3. The apparatus of claim 2, wherein a thickness of the hydrophobic material layer measured in a direction perpendicular to a plane defined by the first surface is 100 microns or less.

4. The apparatus of claim 3, wherein the thickness of the hydrophobic material layer is 5 microns or less.

5. The apparatus of claim 1, wherein the hydrophilic material comprises at least one material selected from the group consisting of mica, glass, and glass-ceramic composite materials.

6. The apparatus of claim 1, wherein the hydrophilic material comprises at least one material selected from the group consisting of metals and metal oxides.

7. The apparatus of claim 1, wherein the hydrophilic material comprises an oxidized product of the hydrophobic material.

8. The apparatus of claim 1, wherein the hydrophobic material comprises at least one material selected from the group consisting of polydimethylacrylamide, polydimethylsiloxane, polyolefins, and fluoropolymers.

9. The apparatus of claim 1, further comprising at least one spacer positioned on the first surface so that when the substrate is in the second position, the substrate contacts the at least one spacer, and a maximum variation in a closest distance between the substrate and the first surface for any two locations on the first surface is 10 microns or less.

10. The apparatus of claim 1, further comprising a fluid outlet port positioned on the second surface.

11. The apparatus of claim 10, wherein a center of the fluid outlet port is displaced from a central axis of the fluid delivery area along a direction orthogonal to the central axis.

12. The apparatus of claim 10, further comprising first and second fluid inlet ports positioned on the second surface on opposite sides of a central axis of the fluid delivery area, wherein for each of the first and second fluid inlet ports:
a flow axis extends between a center of the fluid inlet port and the fluid outlet port; and
an angle between the flow axis and the central axis of the recess is $\alpha$.

13. The apparatus of claim 12, further comprising third and fourth fluid inlet ports positioned on the second surface on opposite sides of the central axis, wherein for each of the third and fourth fluid inlet ports:
a flow axis extends between a center of the fluid inlet port and the fluid outlet port; and
an angle between the flow axis and the central axis of the recess is $\beta$.

14. The apparatus of claim 13, wherein $\beta$ is 10 degrees or less.

15. The apparatus of claim 14, wherein $\beta$ is 6 degrees or less.

16. The apparatus of claim 13, wherein $\alpha$ is larger than $\beta$.

17. The apparatus of claim 12, wherein $\alpha$ is 15 degrees or less.

18. The apparatus of claim 17, wherein $\alpha$ is 10 degrees or less.

19. The apparatus of claim 12, wherein the second surface is planar.

20. The apparatus of claim 19, wherein the fluid delivery area forms a recess in the first surface, and wherein the recess comprises lateral wall surfaces that extend between the first and second surfaces.

21. The apparatus of claim 20, wherein each pair of adjacent lateral wall surfaces is oriented so that an angle subtended by the surfaces is more than 90 degrees.

22. The apparatus of claim 21, wherein each pair of adjacent lateral wall surfaces blend along a rounded fillet.

23. The apparatus of claim 20, wherein the recess comprises:
parallel first and second lateral wall surfaces;
a third lateral wall surface orthogonal to the first and second lateral wall surfaces;
fourth and fifth lateral wall surfaces extending between the third lateral wall surface and the first and second lateral wall surfaces, respectively; and
sixth and seventh lateral wall surfaces that extend from the first and second lateral wall surfaces, respectively, and that intersect.

24. The apparatus of claim 23, wherein the bottom surface of the recess has a heptagonal transverse shape, and wherein at least some of the lateral wall surfaces of the recess have different lengths.

25. The apparatus of claim 23, wherein the first, second, third, and fourth fluid inlet ports are positioned closer to the third lateral wall surface than to the sixth and seventh lateral wall surfaces.

26. The apparatus of claim 1, wherein a maximum depth of the fluid delivery area, measured along a direction perpendicular to the upper surface, is 200 microns or less.

27. The apparatus of claim 26, wherein the maximum depth is 150 microns or less.

28. The apparatus of claim 1, wherein a difference between the water contact angles of the hydrophobic material and the hydrophilic material is 50 degrees or more.

29. The apparatus of claim 28, wherein the difference between the water contact angles of the hydrophobic material and the hydrophilic material is 70 degrees or more.

* * * * *